US012589762B2

(12) United States Patent
Blunt et al.

(10) Patent No.: US 12,589,762 B2
(45) Date of Patent: Mar. 31, 2026

(54) ANIMAL INTERACTION BASED VEHICLE CONFIGURATION

(71) Applicant: Rivian IP Holdings, LLC, Plymouth, MI (US)

(72) Inventors: Matthew Marston Blunt, Costa Mesa, CA (US); Jonathan David Salerno, Newport, CA (US); Mary Elizabeth Mossey, Costa Mesa, CA (US); Aaron Weast, Battle Ground, WA (US); Anton Alferness, Ladera Ranch, CA (US); Erik Robert Glaser, San Mateo, CA (US); Kaitlyn Benoit, Newport Beach, CA (US)

(73) Assignee: Rivian IP Holdings, LLC, Plymouth, MI (US)

(*) Notice: Subject to any disclaimer, the term of this patent is extended or adjusted under 35 U.S.C. 154(b) by 105 days.

(21) Appl. No.: 18/091,236

(22) Filed: Dec. 29, 2022

(65) Prior Publication Data

US 2024/0217531 A1 Jul. 4, 2024

(51) Int. Cl.
| | |
|---|---|
| *B60W 50/10* | (2012.01) |
| *A01K 11/00* | (2006.01) |
| *A01K 29/00* | (2006.01) |
| *B60W 10/22* | (2006.01) |
| *B60W 10/30* | (2006.01) |

(Continued)

(52) U.S. Cl.
CPC ........... *B60W 50/10* (2013.01); *A01K 11/006* (2013.01); *A01K 29/005* (2013.01); *B60W 10/22* (2013.01); *B60W 10/30* (2013.01); *B60W 50/16* (2013.01); *B60W 2050/143* (2013.01); *B60W 2556/45* (2020.02)

(58) Field of Classification Search
CPC ..... B60H 1/00742; G08B 21/22; G08B 21/02
USPC ....................................................... 701/45, 36
See application file for complete search history.

(56) References Cited

U.S. PATENT DOCUMENTS

| | | | | |
|---|---|---|---|---|
| 5,650,770 | A | * 7/1997 | Schlager | ............ G08B 21/0286 |
| | | | | 340/573.1 |
| 6,043,748 | A | * 3/2000 | Touchton | ............. A01K 15/023 |
| | | | | 340/10.5 |

(Continued)

FOREIGN PATENT DOCUMENTS

| | | | | |
|---|---|---|---|---|
| DE | 102014215293 A1 * | 2/2016 | ........... | B60G 17/017 |
| WO | WO-2019061502 A1 * | 4/2019 | ............. | B60G 17/08 |

OTHER PUBLICATIONS

Fi. "The Smartest Tech Ever Built for Your Dog," How Fi Series 3 Works, Fi Smart Dog Collar, retrieved from: https://tryfi.com/learn, on Jan. 17, 2023.

(Continued)

*Primary Examiner* — Phutthiwat Wongwian
*Assistant Examiner* — Brian R Kirby
(74) *Attorney, Agent, or Firm* — Patterson + Sheridan, LLP

(57) ABSTRACT

Some embodiments may provide a method for improving a vehicle's accessibility. A digital tag may be associated with the vehicle. Signals from the digital tag may be received. Based on the signals, information about a person and an animal may be inferred. The person may have a driver profile associated with the vehicle. The animal may be bearing the digital tag. Based on inferring from the information that the person may intend for the animal to occupy the vehicle, a setting of the vehicle may be modified.

18 Claims, 14 Drawing Sheets

(51) Int. Cl.
  *B60W 50/14* (2020.01)
  *B60W 50/16* (2020.01)

(56) References Cited

U.S. PATENT DOCUMENTS

| | | | | |
|---|---|---|---|---|
| 6,067,018 | A * | 5/2000 | Skelton | A01K 27/009 |
| | | | | 119/908 |
| 6,271,757 | B1 * | 8/2001 | Touchton | A01K 15/023 |
| | | | | 119/908 |
| 6,581,546 | B1 * | 6/2003 | Dalland | A01K 15/023 |
| | | | | 119/712 |
| 6,583,715 | B1 * | 6/2003 | Benzie | E05B 83/40 |
| | | | | 340/5.72 |
| 7,173,535 | B2 * | 2/2007 | Bach | G08B 21/0261 |
| | | | | 340/573.2 |
| 7,324,044 | B2 * | 1/2008 | Durst | G01S 5/0027 |
| | | | | 342/357.55 |
| 7,761,205 | B2 * | 7/2010 | Onuma | B60G 17/016 |
| | | | | 701/37 |
| 7,847,727 | B2 * | 12/2010 | Hensley | G01S 19/51 |
| | | | | 342/357.34 |
| 9,258,982 | B1 * | 2/2016 | Golden | A01K 15/021 |
| 9,463,805 | B2 * | 10/2016 | Kirsch | B60G 17/015 |
| 9,676,325 | B1 * | 6/2017 | Duan | B60Q 9/00 |
| 9,842,448 | B1 * | 12/2017 | Lickfelt | G07C 9/00896 |
| 10,228,447 | B2 * | 3/2019 | Rich | A01K 11/008 |
| 11,778,420 | B2 * | 10/2023 | Ickovic | H04W 84/18 |
| | | | | 455/456.2 |
| 11,999,232 | B2 * | 6/2024 | Salter | B60H 1/00978 |
| 2002/0145516 | A1 * | 10/2002 | Moskowitz | B60H 1/008 |
| | | | | 340/541 |
| 2003/0007074 | A1 * | 1/2003 | Nagaoka | H04N 7/18 |
| | | | | 348/148 |
| 2006/0114101 | A1 * | 6/2006 | Schambeck | B60R 25/241 |
| | | | | 340/5.61 |
| 2009/0040306 | A1 * | 2/2009 | Foote | B60K 35/10 |
| | | | | 348/148 |
| 2009/0044758 | A1 * | 2/2009 | Adams | A01K 15/021 |
| | | | | 119/28.5 |
| 2010/0139576 | A1 * | 6/2010 | Kim | A01K 15/023 |
| | | | | 119/859 |
| 2011/0232585 | A1 * | 9/2011 | Rich | A01K 27/009 |
| | | | | 342/458 |
| 2015/0127215 | A1 * | 5/2015 | Chatterjee | B60H 1/00642 |
| | | | | 701/1 |
| 2016/0021506 | A1 * | 1/2016 | Bonge, Jr. | G16H 40/67 |
| | | | | 717/173 |
| 2016/0272035 | A1 * | 9/2016 | Oishi | B60G 17/017 |
| 2016/0355181 | A1 * | 12/2016 | Morales Teraoka | |
| | | | | B60W 30/0956 |
| 2017/0011609 | A1 * | 1/2017 | Pace | G07C 5/08 |
| 2017/0242428 | A1 * | 8/2017 | Pal | A61B 5/021 |
| 2017/0265432 | A1 * | 9/2017 | Anderton | A01K 15/029 |
| 2017/0282822 | A1 * | 10/2017 | Hunter, Jr. | B60N 2/0035 |
| 2017/0282856 | A1 * | 10/2017 | Riedel | B60R 25/24 |
| 2017/0330295 | A1 * | 11/2017 | Alden | A01K 11/006 |
| 2017/0334354 | A1 * | 11/2017 | Hatton | B60Q 9/008 |
| 2019/0118603 | A1 * | 4/2019 | Feit | B60G 11/27 |
| 2019/0294894 | A1 * | 9/2019 | Fox | G08B 13/19647 |
| 2020/0062269 | A1 * | 2/2020 | Vardharajan | B60W 50/0098 |
| 2020/0130702 | A1 * | 4/2020 | Ferreira | H04W 4/48 |
| 2022/0248659 | A1 * | 8/2022 | Salter | A01M 29/18 |
| 2022/0324415 | A1 * | 10/2022 | Salter | B60R 25/305 |

OTHER PUBLICATIONS

Garmin. (1996-2023). "T 5X Dog Collar," Dog Tracking Collar, Part No. 010-02755-70, retrieved from: https://www.garmin.com/en-US/p/856959, on Jan. 17, 2023.

Garmin. (1996-2023). "TT™ 15X Dog Collar," Dog Tracking and Training Collar, GPS Dog Tracker with Collar, Part No. 010-02755-80, retrieved from: https://www.garmin.com/en-US/p/856402, on Jan. 17, 2023.

Halo. (2022). "How Halo Works," Features-Halo Collar, retrieved from: https://www.halocollar.com/features/, on Jan. 17, 2023.

* cited by examiner

1000

1010 — Associate a digital tag with a vehicle

1020 — Receive signals from the digital tag

1030 — Infer information about a person having a driver profile associated with the vehicle and an animal bearing the digital tag 1040 — Does the person intend for the animal to occupy the vehicle?

No

Yes

1050 — Modify a setting of the vehicle

FIRMWARE 1450

ANALYZING SENSOR DATA 1452

PROCESSING USER INPUT 1454

LOGGING / REPORTING EVENTS 1456

ASSESSING SAFETY PARAMETERS 1458

TRANSMITTING CONTROL SIGNALS 1460

COMPUTER SYSTEM 1400

PROCESSOR 1402

MEMORY 1404

STORAGE 1406

I/O INTERFACE 1408

COMMUNICATION INTERFACE 1410

1412

ANIMAL INTERACTION BASED VEHICLE CONFIGURATION

INTRODUCTION

Generally, a vehicle does not automatically change configurations to provide better accessibility for an animal or a person. Many users of a vehicle may own an animal, and may wish to configure the vehicle to improve the accessibility of the vehicle for the animal. Additionally, some users of a vehicle may be mobility impaired and may wish to configure the vehicle to better improve the accessibility of the vehicle for themselves.

BRIEF SUMMARY

In some embodiments, a method may provide for improving a vehicle's accessibility. A digital tag may be associated with a vehicle. Signals from the digital tag may be received. Based on the signals, information about a person and an animal may be inferred. The person may have a driver profile associated with the vehicle. The animal may be bearing the digital tag. Based on inferring from the information that the person may intend for the animal to occupy the vehicle, a setting of the vehicle may be modified.

In some embodiments, the setting may include a suspension setting, an assisted entry setting, a climate control setting, a safety setting, a collision warning setting, an occupancy alert setting, or a digital fence setting.

In some embodiments, the information about the animal bearing the digital tag may include a location. The location may be based on a detected location of the digital tag.

In some embodiments, modifying the suspension setting may be based on the location of the animal bearing the digital tag.

In some embodiments, modifying the assisted entry setting may include modifying a configuration of a door, a step, a ladder, a ramp, or a lift.

In some embodiments, modifying the climate control setting may be based on the location being within a specified zone. When the animal is within a specified zone, a climate control system associated with the specified zone may be activated or may be adjusted to a specified temperature.

In some embodiments, modifying the safety setting may include deactivating an airbag, a seat-belt chime, a seat-belt pre-tensioner, or a window switch associated with a specified zone.

In some embodiments, modifying the collision warning setting may be based on the location being within a threshold distance outside the vehicle. Modifying the collision warning setting may include generating a warning. Generating a warning may include activating a sound emitter, activating a light, or generating a notification to a driver.

In some embodiments, modifying the occupancy alert setting may include detecting an absence of the person within the vehicle, or within a threshold distance outside the vehicle, and detecting a presence of the animal within the vehicle. Modifying the occupancy alert setting may also include generating an alert. Generating a warning may include activating a sound emitter, activating a light, or generating a notification to the person.

In some embodiments, modifying the digital fence setting may include determining a distance from the vehicle, or a mobile device associated with the vehicle, to the location. Modifying the digital fence setting may also include generating a notification to the person. Generating a notification to the person may be based on the distance being greater than a threshold distance.

In some embodiments, a setting of the digital tag may be modified. Modifying a setting of the digital tag may be based on the distance being greater than the threshold distance. Modifying a setting of the digital tag may include generating an auditory output, visual output, electrical output, or haptic output. Modifying a setting of the digital tag may include activating an extended tracking mode for the digital tag.

In some embodiments, the digital tag may be incorporated in a wearable device or article of clothing. The wearable device may include a collar, a harness, or a head halter.

In some embodiments, a point-of-interest associated with the animal may be displayed on a display associated with the vehicle. Displaying the point-of-interest associated with the animal may be based on the information about the animal bearing the digital tag.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DETAILED DESCRIPTION

Figure 1:
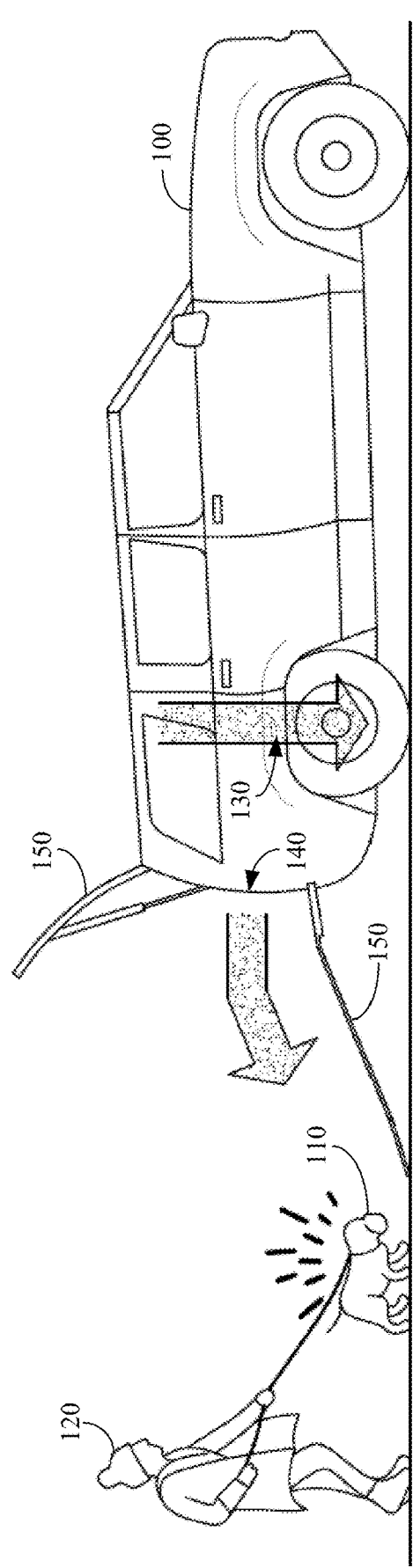
FIG. 1 illustrates an example of modifying a suspension setting of a vehicle.

In some embodiments, a method may provide for improving a vehicle's accessibility. A digital tag may be associated with a vehicle. Signals from the digital tag may be received. Based on the signals, information about a person, who may have a driver profile associated with the vehicle, and an animal, who may be bearing the digital tag, may be inferred. Based on inferring from the information that the person may intend for the animal to occupy the vehicle, a setting of the vehicle may be modified.

In some embodiments, the setting may include a suspension setting, an assisted entry setting, a climate control setting, a safety setting, a collision warning setting, an occupancy alert setting, or a digital fence setting.

In some embodiments, the information about the animal bearing the digital tag may include a location. The location may be based on a detected location of the digital tag.

In some embodiments, modifying the suspension setting may be based on the location.

In some embodiments, modifying the assisted entry setting may include modifying a configuration of a door, a step, a ladder, a ramp, or a lift.

In some embodiments, modifying the climate control setting may be based on the location being within a specified zone. When the animal is within a specified zone, a climate control system associated with the specified zone may be activated or may be adjusted to a specified temperature.

In some embodiments, modifying the safety setting may include deactivating an airbag, a seat-belt chime, a seat-belt pre-tensioner, or a window switch associated with a specified zone.

In some embodiments, modifying the collision warning setting may be based on the location being within a threshold distance outside the vehicle. Modifying the collision warning setting may include generating a warning. Generating a warning may include activating a sound emitter, activating a light, or generating a notification to a driver.

In some embodiments, modifying the occupancy alert setting may include detecting an absence of the person within the vehicle, or within a threshold distance outside the vehicle, and detecting a presence of the animal within the vehicle. Modifying the occupancy alert setting may also include generating an alert. Generating a warning may include activating a sound emitter, activating a light, or generating a notification to the person.

In some embodiments, modifying the digital fence setting may include determining a distance from the vehicle, or a mobile device associated with the vehicle, to the location. Modifying the digital fence setting may include generating a notification to the person. Generating a notification to the person may be based on the distance being greater than a threshold distance.

In some embodiments, a setting of the digital tag may be modified. Modifying a setting of the digital tag may be based on the distance being greater than the threshold distance. Modifying a setting of the digital tag may include generating an auditory output, visual output, electrical output, or haptic output. Modifying a setting of the digital tag may include activating an extended tracking mode for the digital tag.

In some embodiments, the digital tag may be incorporated in a wearable device or article of clothing. The wearable device may include a collar, a harness, or a head halter.

In some embodiments, a point-of-interest associated with the animal may be displayed on a display associated with the vehicle. Displaying the point-of-interest associated with the animal may be based on the information about the animal bearing the digital tag.

FIG. 1 illustrates an example of modifying a suspension setting of vehicle 100. In some embodiments, vehicle 100 may be associated with a digital tag. The digital tag may be borne by animal 110. The digital tag may also be carried by person 120. Signals from the digital tag may be received by vehicle 100. Based on the signals, information about animal 110 bearing the digital tag and information about person 120 having a profile associated with vehicle 100 may be inferred. Based the information, whether the person intends for the animal to occupy the vehicle may be inferred. Based on the person intending for the animal to occupy the vehicle, a setting of vehicle 100 may be modified. The setting may include a suspension setting, an assisted entry setting, a climate control setting, a safety setting, a collision warning setting, an occupancy alert setting, or a digital fence setting.

In some embodiments, animal 110 may be associated with person 120 having a profile associated with vehicle 100. Animal 110 being associated with person 120 may allow for each user to configure their own setting modifications. For example, a first person may wish to modify the suspension setting whereas a second person may wish to keep the default suspension setting, even for the same animal. Animal 110, in some embodiments, may have a profile directly associated with vehicle 100. The profile may be an animal profile associated with a specified animal. In some embodiments, the digital tag may have a tag profile associated with vehicle 100. The tag profile may include a pet-type tag profile. The pet-type tag profile may include a set of default settings configured for any animal. The tag profile, or the pet-type tag profile may be used by vehicle 100 when no driver profile or animal profile is associated with vehicle 100.

In some embodiments, the inferred information about animal 110 bearing the digital tag may include a location of animal 110. The location of animal 110 may be based on a detected location of the digital tag. The digital tag may be detected using a sensor. The sensor may include imaging sensors or proximity sensors.

In some embodiments, modifying the suspension setting may be based on the location (e.g., location of the animal). Stated another way, modifying the suspension setting may be based on the relative location of the location in relation to vehicle 100 (e.g., the location is proximate to rear 140 of vehicle 100). Based on the location being proximate to rear 140 of vehicle 100, a rear suspension 130 of vehicle 100 may be modified. Based on the location being proximate to a driver side of vehicle 100, a driver-side suspension of vehicle 100 may be modified. Based on the location being proximate to a passenger side of vehicle 100, a passenger-side suspension of vehicle 100 may be modified. Based on the location being proximate to a front of vehicle 100, a front suspension of vehicle 100 may be modified. Modifying the suspension (e.g. the rear suspension, the driver-side suspension, the passenger-side suspension, or the front suspension) may include increasing or decreasing the height of vehicle 100. Increasing or decreasing the height of vehicle 100 may be for the entire vehicle 100 (i.e., the modification of the height of vehicle 100 is uniform). Increasing or decreasing the height of vehicle 100 may be localized to the location (e.g., only the rear suspension is modified when the location is proximate to the rear of vehicle 100). Increasing or decreasing the height of vehicle 100 may be assisted by decreasing or increasing the suspension on the opposite side of vehicle 100. For example, when the rear suspension 130 is modified to decrease the height of vehicle 100, the front suspension may be modified to increase the height of vehicle 100.

In some embodiments, modifying the assisted entry setting may include modifying a configuration of entry assistant 150. Entry assistant 150 may include a door (e.g., a door to a passenger compartment or a door to a storage compartment), a step, a ladder, a ramp, or a lift. Modifying the configuration of entry assistant 150 may include deploying or retracting entry assistant 150. For example, modifying the configuration of entry assistant 150 may include deploying (i.e., opening) a rear door (e.g., trunk or hatch) and may also include deploying (i.e., extending) a ramp. Modifying the configuration of entry assistant 150 may increase the accessibility of the vehicle (i.e., allow the person or the animal easier access to the vehicle with decreased to no additional assistance).

In some embodiments, the digital tag may be incorporated in a wearable device or an article of clothing. The wearable device may include a collar, a harness, or a head halter. The article of clothing may include a sweater or a shoe.

In some embodiments, vehicle 100 may capture auditory information associated with animal 110. Based on the auditory information, vehicle 100 may modify a setting associated with a security system. The security system may be associated with the vehicle. The intent of animal 110 may be inferred. When the intent of animal 110 is inferred to be aggressive or defensive (e.g., barking or growling), the security system may enter a heightened awareness mode. The heightened awareness mode may include increasing the rate of capture of images or videos (e.g., more frequent pictures with a dash camera), or increasing the sensitivity of security sensors associated with vehicle 100.

Figure 2:
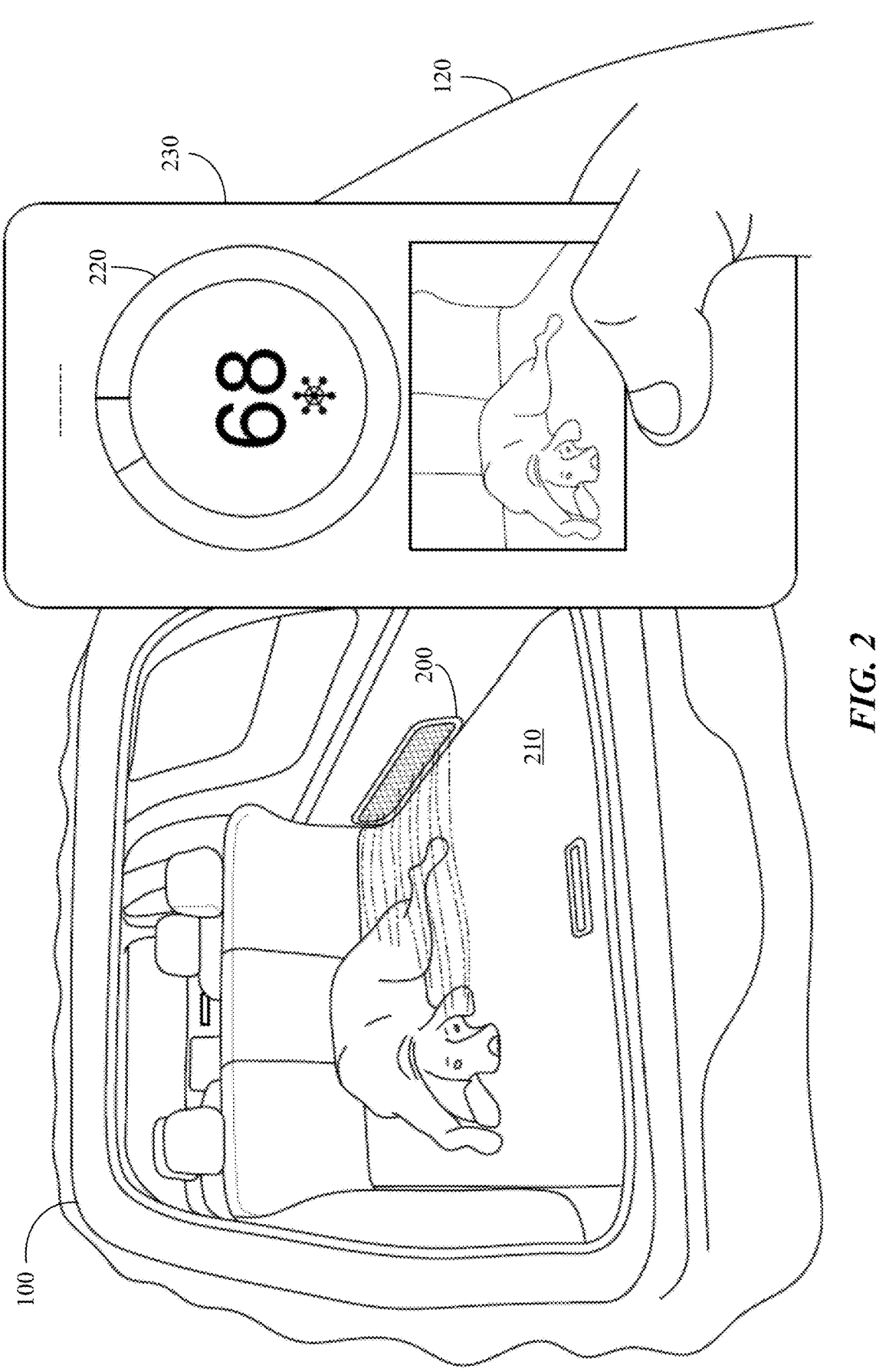
FIG. 2 illustrates an example of modifying a climate control setting of a vehicle.

FIG. 2 illustrates an example of modifying a climate control setting of vehicle 100. In some embodiments, modifying the climate control setting may include activating a climate control system 200 associated with specified zone 210. Modifying the climate control setting may also include adjusting climate control system 200 associated with specified zone 210 to specified temperature 220. Activating or adjusting the climate control system may be based on the location of the animal being within the specified zone. The specified zone may be specified by person 120 (e.g., a user of the vehicle).

In some embodiments, specified temperature 220 may be specified by person 120. Specified temperature 220 may be specified with mobile device 230. Specified temperature 220 may also be automatically determined by vehicle 100 and may be based on ambient conditions inside vehicle 100, ambient conditions outside vehicle 100, a weather forecast, or the information about the animal bearing the digital tag. The ambient conditions inside vehicle 100 and the ambient conditions inside vehicle 100 may include temperature, humidity, or amount of direct sunshine.

In some embodiments, specified zone 210 may include a passenger area (e.g., front passenger seating area or rear passenger seating area) and a storage area (e.g., trunk or frunk). The specified area may be a portion of the passenger area. The portion of the passenger area may include a driver seat or a passenger seat (e.g., front passenger seat, middle row left passenger seat, middle row middle passenger seat, middle row right passenger seat, or rear passenger seat).

In some embodiments, vehicle 100 may be placed in a Pet Mode. Pet Mode activation may be activated when vehicle 100 is in park. Pet Mode may include maintaining a specified climate inside a cabin of vehicle 100. Maintaining the specified climate may include modifying a setting of a heating, ventilation, and air conditioning (HVAC) system. Modifying the setting of the HVAC system may include setting a specified temperature to be maintained by the HVAC system in an occupied climate zone Pet Mode may also include disabling a vehicle alarm. When in Pet Mode, vehicle 100 may display specified information (e.g., Pet Mode is active or the specified climate). Additionally, over-the-air updates may be suspended while Pet Mode is active.

In some embodiments, an interior sensor may capture information about an animal occupying the vehicle. The interior sensor may be capable of detecting weight, motion, or sound. The interior sensor may include a camera, a microphone, or an array of microphones. The interior sensor may also include an ultrasonic sensor. The ultrasonic sensor may capture air pressure information. Based on the information, a climate zone occupied by the animal may be detected. The interior of vehicle 100 may be separated into a plurality of climate zones (e.g., driver climate zone, front passenger climate zone, rear passenger climate zone, third-row climate zone, or cargo climate zone). More than one interior sensor may be used to capture information about the animal and information from more than one interior sensor may be used to detect the location (e.g., which climate zone) of the animal.

In some embodiments, vehicle 100 may display specified information. The specified information may be displayed as part of a pet-mode user interface. The specified information may include information about the environment in the occupied climate zone.

In some embodiments, disabling a vehicle alarm (e.g., ultrasonic alarm, audible alarm, or a visual alarm) may disable an interior sensor (e.g., a cabin movement sensor), or ignore information from the interior sensor. Other sensors may still be enabled and may trigger the vehicle alarm when the cabin movement sensor being disabled. Thus, the vehicle alarm may still sound based on external movement/sounds or when entry into vehicle 100 is detected (e.g., the door is opened or a window is broken). Disabling the cabin movement sensor may reduce vehicle alarm activations triggered by animal 110 moving inside vehicle 100.

In some embodiments, the specified information displayed may include the specified climate. The specified climate may include a user-specified temperature (e.g., the temperature the HVAC is set to cool or heat to), the current cabin temperature, or a current cabin humidity. The specified information displayed may also include a brief explanation on how Pet Mode works, a notice that the pet is safe while Pet Mode is activated, a notice that the vehicle user (e.g., animal's owner) will be back soon, or contact information for the user. In some embodiments, the user may speak with the concerned onlooker. Audio may be saved by the driver and the audio may be played when there is the onlooker. The audio may be played automatically when an onlooker is detected, or the user may play the audio manually.

In some embodiments, Pet Mode activation may be based on the state-of-charge (SOC) of vehicle 100 being above a Pet Mode charge threshold (e.g., 20%). Pet Mode may not be activated when the SOC is below a minimum threshold. If the SOC falls below the minimum threshold while Pet Mode is activated, a notification may be sent to the user alerting them that the SOC has fallen below the minimum threshold. The user may override the minimum threshold and keep pet-mode activated when the SOC falls below the minimum threshold. The override may happen once the SOC has fallen below the minimum threshold. A notification may also be sent to the user when the SOC has fallen below a specified threshold (e.g., 30%). The specified threshold may be greater than the minimum threshold to allow the user greater time and flexibility to take corrective action.

In some embodiments, Pet Mode activation may be based a condition being satisfied. The condition may include a selected gear of vehicle 100 being in park or the parking brake being engaged. In some embodiments, the condition may include an animal being detected. The animal may be detected based on an internal sensor or an animal collar. In some embodiments, Pet Mode may be activated from a mobile device (e.g., smartphone, mobile application, smart watch, or smart watch application). The Pet Mode activation from the mobile device may be based on the aforementioned condition being satisfied. For example, if all the conditions are not satisfied, the option to activate Pet Mode from the mobile device is unavailable.

In some embodiments, information (e.g., settings or status) associated with a Pet Mode may be displayed on a mobile device (e.g., mobile phone, smartphone, or tablet). The information may be displayed using a mobile application or as a website accessible through a web browser. The information may include a Pet Mode activation state, a specified temperature of the HVAC system, a current temperature of the interior of the vehicle, or vital signs of animal 110.

In some embodiments, the Pet Mode activation or information may be displayed based on a user's historical information associated with Pet Mode. The historical information may include a temperature (e.g., inside or outside the vehicle), a time, or a vehicle location where the user previously activated Pet Mode.

In some embodiments, Pet Mode may monitor animal 110. Monitoring may be performed by a sensor (e.g., camera, microphone, or ultrasonic sensor) inside a cabin of vehicle 100. Based on the data captured by the sensor, a state of agitation of animal 110 may be determined. Upon the state of agitation being greater than a specified agitation threshold, a notification may be sent to a user. Pet Mode may, in some embodiments, further include audio or visual communication with the animal. The communication may be performed by a mobile device connected to vehicle 100. A display of vehicle 100 may display a video of the user in real-time (e.g., videoconferencing). The communication may also be in the form of prerecorded audio or video to reduce the state of agitation of animal 110. The prerecorded audio or video may automatically play when the state of agitation is greater than a specified agitation threshold.

In some embodiments, Pet Mode may integrate with an animal collar. The integration may provide information regarding the location of animal 110. The animal collar may emit signals. The emitted signals may be captured by sensors, and the sensors may triangulate animal 110 within vehicle 100 based on the captured signals. The animal collar, in some embodiments, may automatically enable a pet mode when animal 110 is detected (e.g., within the cabin of vehicle 100).

In some embodiments, the specified climate may further be directed towards a specified zone within vehicle 100. The specified zone may be based on the location of animal 110. Directing the specified climate (e.g., heating, ventilation, or air conditioning) may reduce the power required and may extend the length of time Pet Mode may be activated for.

In some embodiments, the specified climate may further be directed towards multiple specified zones within vehicle 100. Each of the multiple specified zones may be based on the location of each animal.

In some embodiments, a location of animal 110 may be based on a sensor. The sensor may include a seat sensor, an interior camera, or a microphone array. The location of animal 110 may also be based on signals emitted from a collar. The location may also be based on a fusion of one or more of the sensors, or a fusion of one or more of the sensors with the signals emitted from the collar.

In some embodiments, the specified climate may be further based on an ambient temperature outside the vehicle, an ambient temperature inside the vehicle, or a combination of the two. For example, if the ambient temperature is substantially higher than the ambient temperature inside the vehicle, the air conditioning may be increased (e.g., colder air or a higher volume of air). In some embodiments, the specified climate may be further based on an amount of solar radiation. The solar radiation may include solar radiation entering the vehicle. For example, more air conditioning may be supplied when there is more solar radiation.

In some embodiments, the specified climate may further be based on vital signs of animal 110. The vital signs may include a heart rate or a respiratory rate. The vital signs may also include blood pressure or temperature of animal 110. For example, the temperature of the specified climate may be decreased when the temperature of animal 110 is higher than an expected temperature. The vital signs, in some embodiments, may be displayed on a mobile device or on a display associated with vehicle 100. The size of the animal may, in some embodiments, be used to determine the specified climate.

In some embodiments, the specified climate may be further based on historical information. The historical information may include historical weather information or user preferences at a specified time or location. For example, a user may have activated Pet Mode for 70°F at a grocery store in the morning in the past, and under similar conditions (e.g., time or location) Pet Mode may set the specified climate to 70° F.

In some embodiments, Pet Mode may detect a concerned third party. A third party may be detected as being proximate to the vehicle. An inference may be made regarding the third party being concerned about animal 110. When a third party is detected, a notification may be sent to the driver. The notification may, in some embodiments, be sent when the third party is inferred to be concerned about animal 110. A video feed of the onlooker or an area proximate to vehicle 100 may be provided to the user. The user may communicate to the onlooker that animal 110 is safe. The communication may be audio, visual, or via text. The text may be displayed on a display associated with vehicle 100. The audio or video may be prerecorded audio or video or may be live audio or video from the mobile device.

In some embodiments, Pet Mode may dispense a treat. The user may manually dispense a treat from a mobile device. Dispensing of the treat may also be performed by a third party. For example, upon detection of a third party, vehicle 100 may prompt the onlooker to dispense a treat for animal 110 by a specified action. Upon detection of the specified action, the treat may be dispensed. In other embodiments, there may be a button for animal 110 to touch to dispense a treat.

In some embodiments, a display (e.g., center information display) associated with vehicle 100 may include entertainment (e.g., squirrel videos or calming sounds) for animal 110.

In some embodiments, Pet Mode may include a Pet Comfort Mode. The Pet Comfort Mode may include cabin noise cancellation. The cabin noise cancellation may be based on sounds received by a microphone. The Pet Comfort Mode may also include inducing movement in vehicle 100. The vehicle movement may include a rocking motion. Rocking vehicle 100 may be performed by an air suspension. For example, the air suspension may raise and lower to simulate a rocking motion. The rocking motion may help the animal calm down or fall asleep. When there is more than one animal in the cabin, the Pet Comfort Mode may identify which animal is agitated. The identification may be performed by voice recognition. Information about which animal is agitated may be sent back to the user.

Figure 3:
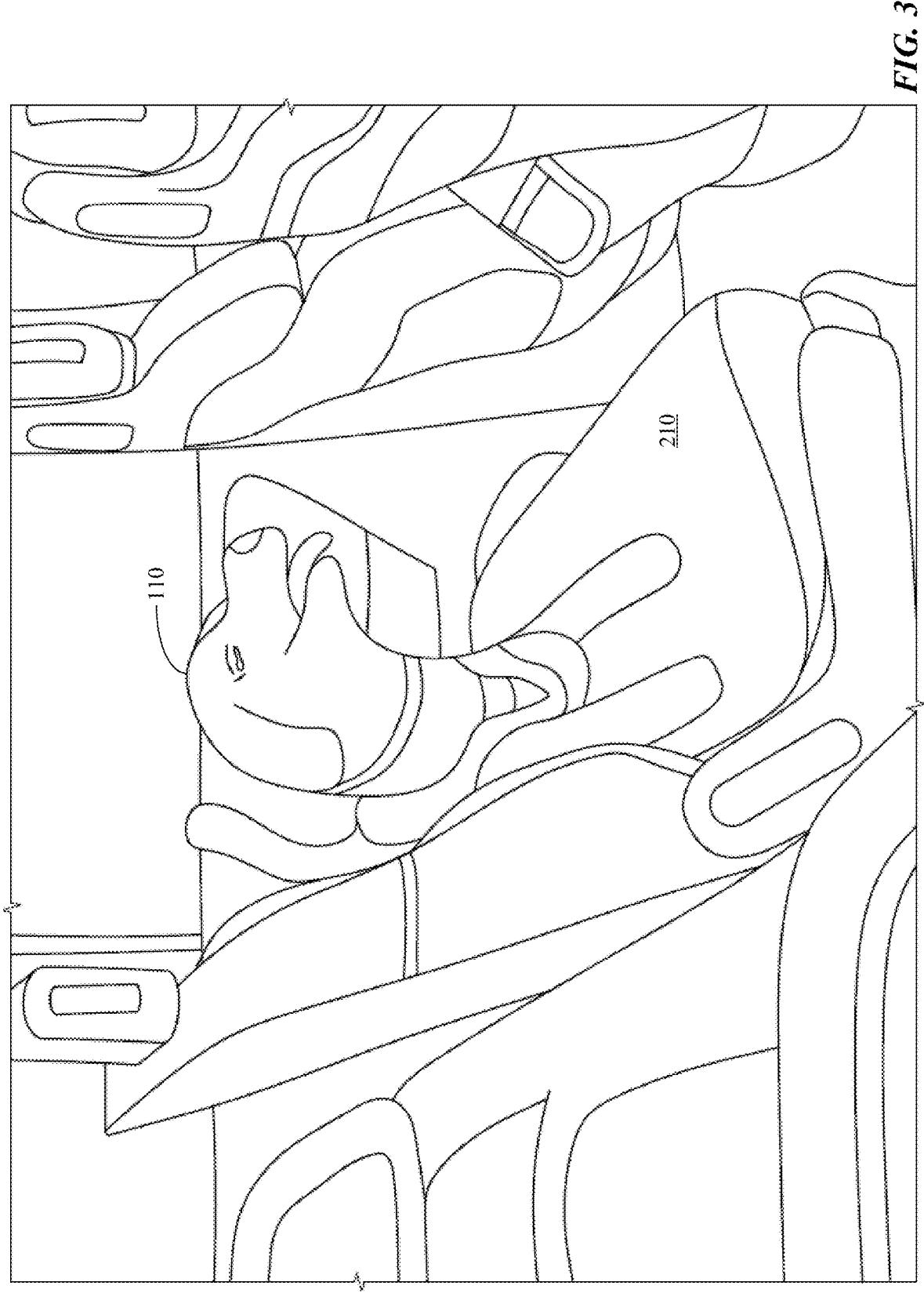
FIG. 3 illustrates an example of modifying a safety setting of a vehicle.

FIG. 3 illustrates an example of modifying a safety setting of vehicle 100. In some embodiments, modifying the safety setting may include deactivating an airbag, a seat-belt chime, a seat-belt pre-tensioner, or a window switch associated with specified zone 210. Modifying the safety setting may be based on the location being within specified zone 210. The location may be based on a weight exceeding a threshold weight being detected by a weight sensor within specified zone 210. The weight sensor may be embedded into a seat of vehicle 100.

Figure 4:
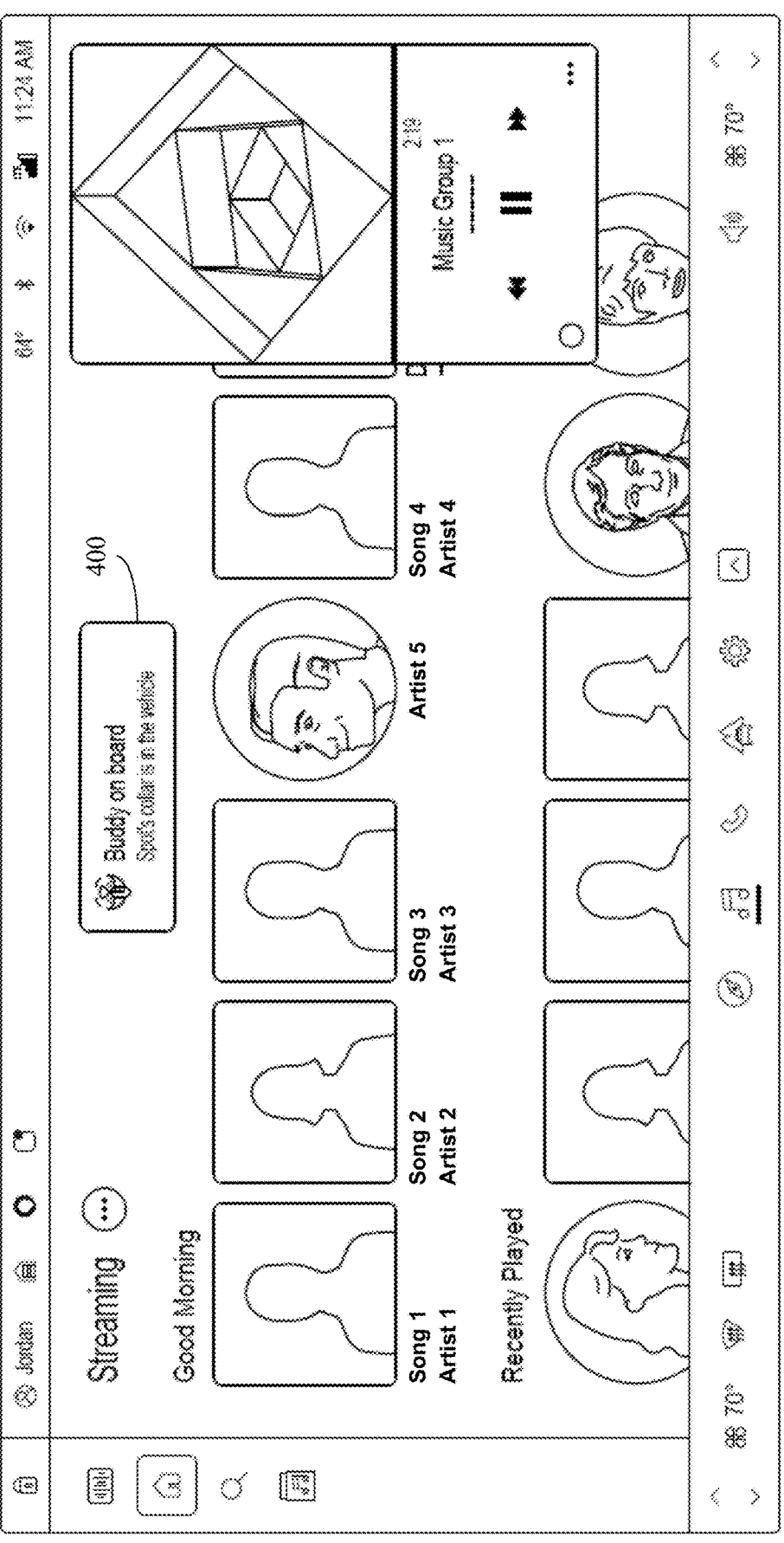
FIG. 4 illustrates an example occupancy alert of a vehicle.

FIG. 4 illustrates an example occupancy alert of vehicle 100. In some embodiments, modifying the occupancy alert setting may include detecting an absence of person 120 within vehicle 100 or within a threshold distance outside vehicle 100, detecting the presence of animal 110 within vehicle 100, and generating alert 400. Generating alert 400 may include activating a sound emitter, activating a light, or generating a notification to the person. The sound emitter may include a speaker or a horn. The light may include an exterior light, an interior light, or an accessory light.

In some embodiments, the occupancy alert may automatically turn on when animal 110 or the digital tag is still in vehicle 100 when vehicle 100 is parked and the doors of vehicle 100 are closed. The occupancy alert may further require the doors of vehicle 100 to be opened, and then closed before automatically turning on. The notification may be displayed on a display associated with vehicle 100. The display may include information about the animal. The display may also include information about the digital tag (e.g., which digital tag has been detected). The display may also include the location (e.g., which specified zone the digital tag or the animal is within).

Figure 5:
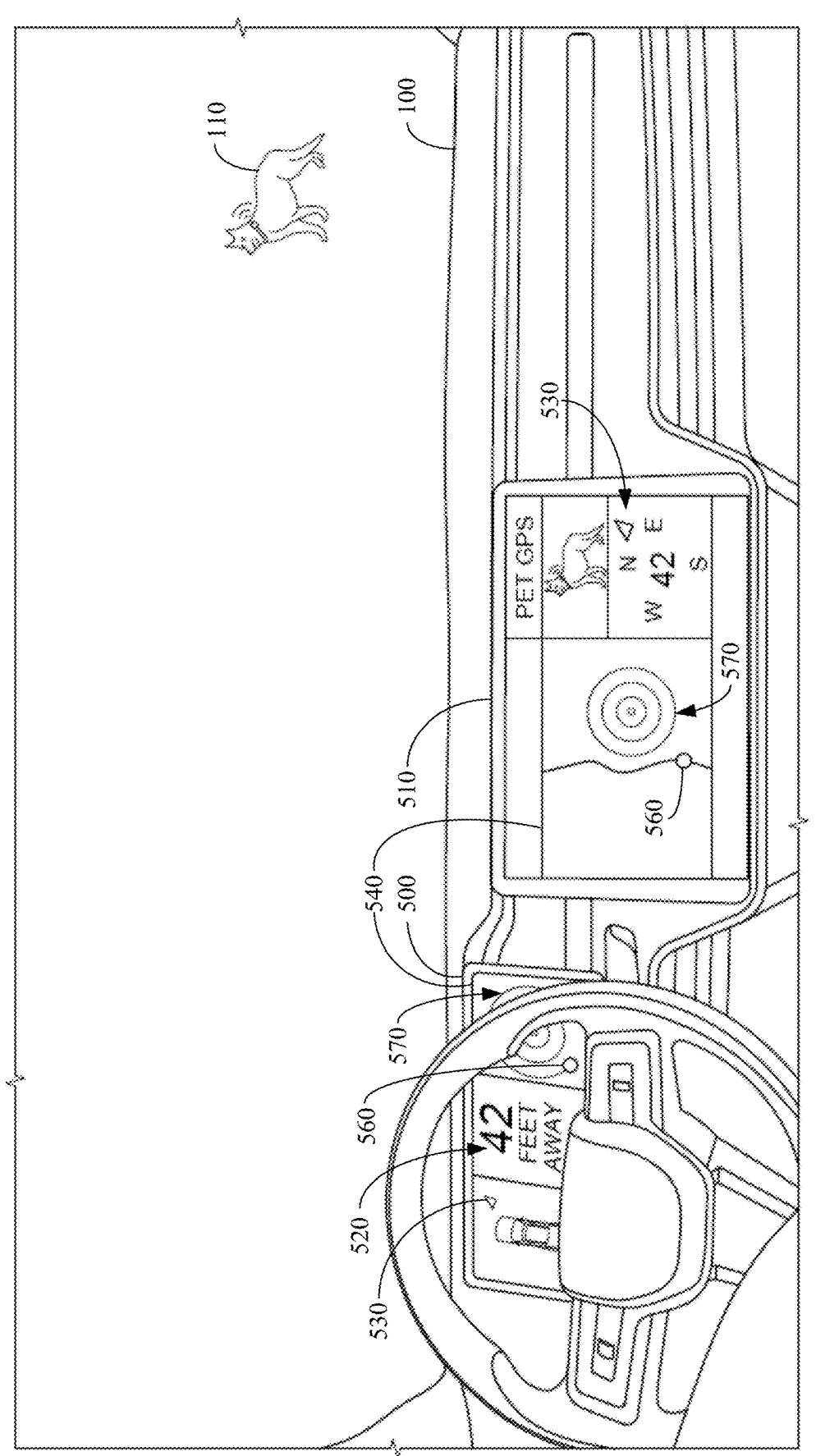
FIG. 5 illustrates an example warning from a collision warning system of a vehicle.

FIG. 5 illustrates an example warning from a collision warning system of vehicle 100. In some embodiments, modifying the collision warning setting may include generating a warning. Generating the warning may be based on the location being within a threshold distance outside the vehicle. Generating the warning may include activating a sound emitter, activating a light, or generating a notification to a driver. The sound emitter may include a speaker or a horn. The light may include an exterior light, an interior light, or an accessory light.

The notification to the driver may be displayed on a display associated with vehicle 100. The display may include dashboard display 500, infotainment display 510, or mobile device 230. The notification may include distance information 520 regarding how far away animal 110 is from vehicle 100. The notification may also include direction information 530 regarding where animal 110 is relative to vehicle 100. The notification may also include proximity map 540 showing where animal 110 is in relation to vehicle 100. Proximity map 540 may include vehicle indicator 550 and animal indicator 560. Animal indicator 560 may include a margin of error indicator 570.

Figure 6:
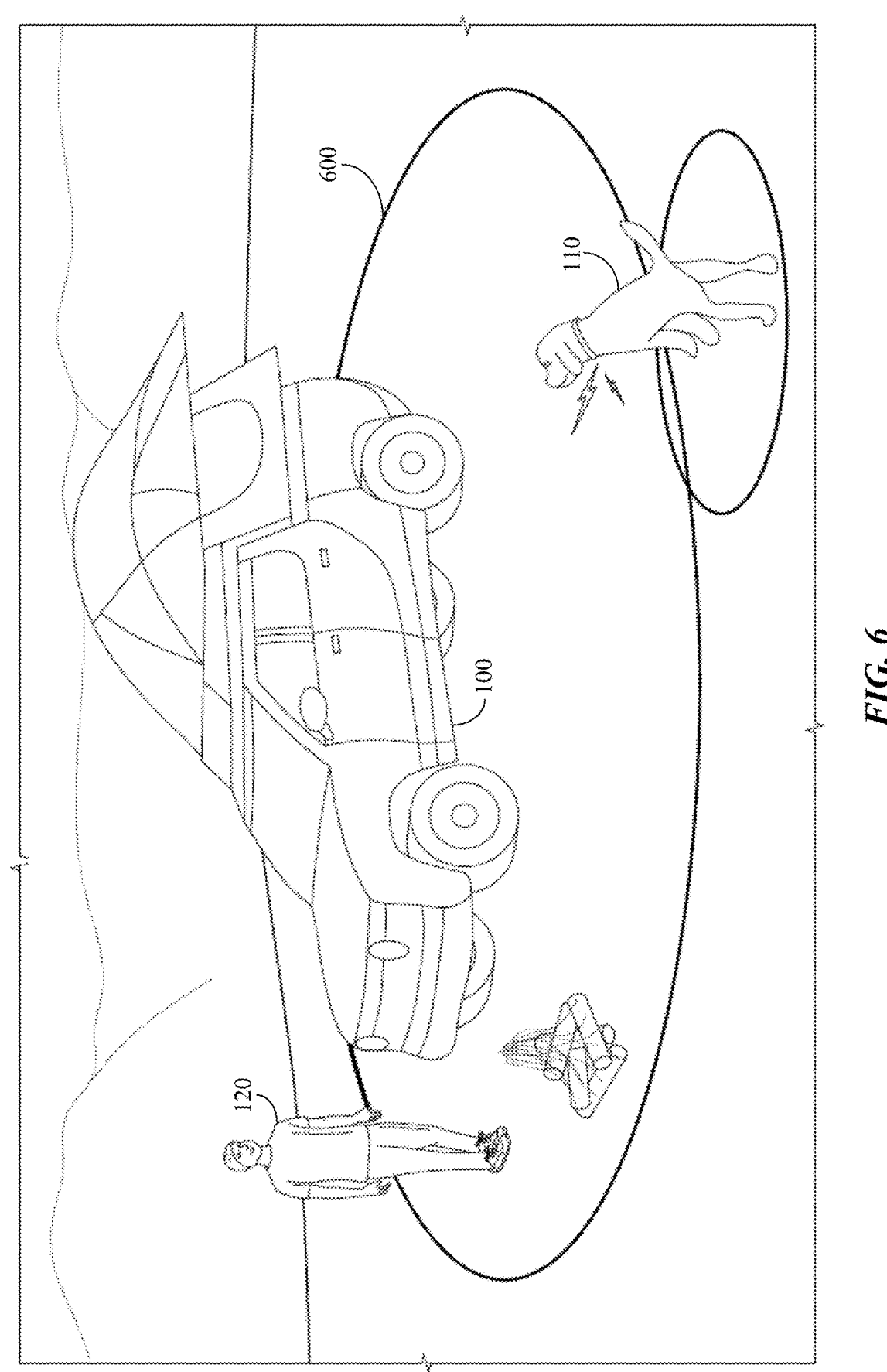
FIG. 6 illustrates an example digital fence associated with a vehicle.

FIG. 6 illustrates an example digital fence 600 associated with vehicle 100. In some embodiments, modifying the digital fence setting may include determining a distance from vehicle 100 to the location. Based on the distance being greater than a threshold distance 610, a notification to person 120 may be generated. The notification may be generated on a display associated with vehicle 100. The display may include dashboard display 500, infotainment display 510, or mobile device 230.

In some embodiments threshold distance 610 may be specified by person 120. Threshold distance 610 may be based on information about the person or the animal. The person may have a driver profile associated with the vehicle. The animal may be bearing the digital tag. Threshold distance 600 may be uniform about the vehicle (e.g., threshold distance 610 is a circle around vehicle 100). Threshold distance 600 may extend further in one direction than another. For example, threshold distance 600 may be set to a shorter distance on a specified side of the vehicle because on the specified side of the vehicle is a hazard (e.g., cliff, bushes, or road).

Figure 7:
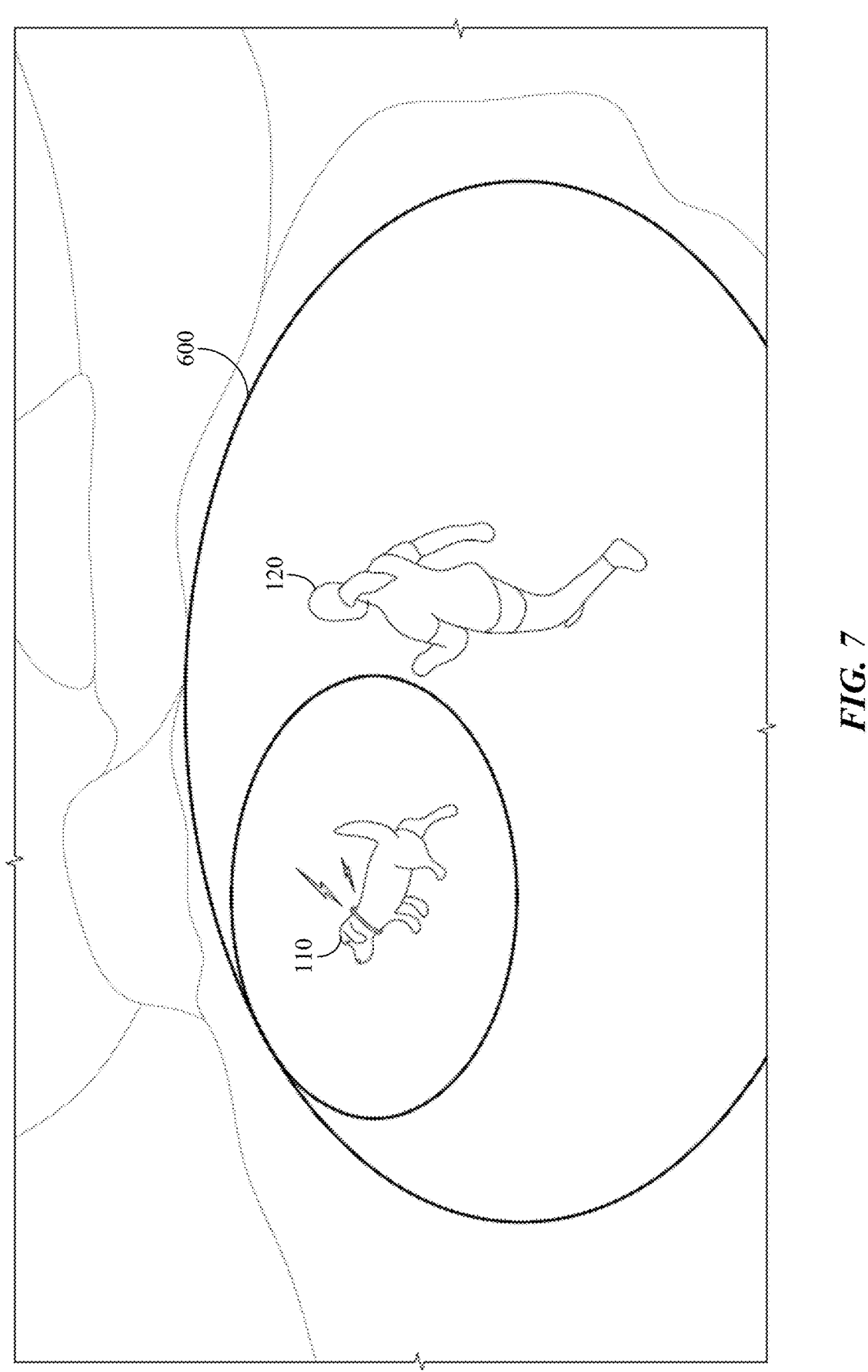
FIG. 7 illustrates an example digital fence associated with a mobile device.

FIG. 7 illustrates an example digital fence 600 associated with mobile device 230. In some embodiments, modifying the digital fence setting may include determining a distance from mobile device 230 associated with vehicle 100 to the location. Based on the distance being greater than threshold distance 600, a notification to person 120 may be generated.

In some embodiments, a setting of the digital tag may be modified. The modification of the setting of the digital tag may be based on the distance being greater than the threshold distance.

In some embodiments, modifying the setting of the digital tag may be based on inferring a velocity or an acceleration of animal 110. The velocity or the acceleration may be based on a determined velocity or a determined acceleration, respectively, of the digital tag. The determined velocity or the determined acceleration may be based on the signals received from the digital tag. The determined velocity or the determined acceleration may be based on information (e.g., images or range) captured by sensors associated with vehicle 100 or by sensors associated with mobile device 230. Mobile device 230 may be associated with vehicle 100.

In some embodiments, modifying a setting of the digital tag may include generating an output. The output may include an auditory output, a visual output, an electrical output, or a haptic output. The auditory output may include period or generated noises, chimes, pre-recorded messages, or messages recorded by person 120. The generated noises may include frequencies an animal can hear but most humans cannot. The visual output may be light. The intensity of the light may vary (e.g., blinking, strobing, breathing, flashing). The color of the light may vary. Varying intensity and color of the light may help alert person 120 that animal 110 may intend to breach digital fence 600. The electrical output may include a buzz or a shock. The haptic output may include force feedback, kinesthetic haptic feedback, or other haptic technology to simulate the experience of touch. The haptic technology may include forces, vibrations, or motions. The output may vary based on the velocity, acceleration, or distance from the threshold distance. For example, a dog that is stationary and past the threshold distance may generate a low-volume auditory output, whereas a dog that is sprinting towards the threshold distance may generate a high-volume auditory output.

In some embodiments, modifying a setting of the digital tag may include activating an extended tracking mode for the digital tag. The extended tracking mode may include activating a higher-powered locating system. The higher-powered locating system may include a global position system. The extended tracking mode may increase the allowable power consumption for any locating systems associated with the digital tag.

Figure 8:
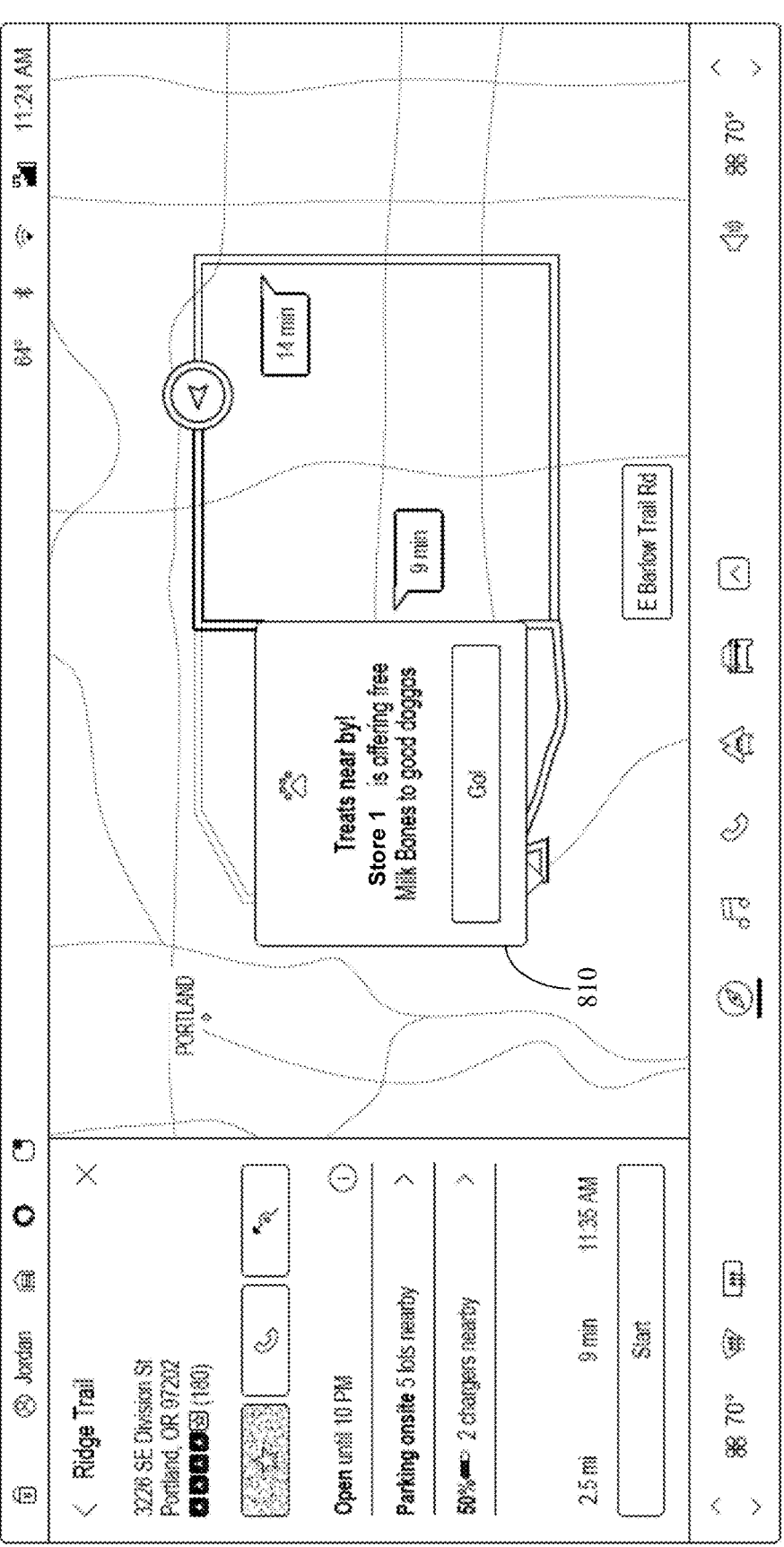
FIG. 8 illustrates an example advertisement associated with an animal.

FIG. 8 illustrates an example advertisement user interface 800. In some embodiments, advertisement 810 may be displayed on a display associated with vehicle 100. Displaying advertisement 810 may be based on the information about animal 110 bearing the digital tag. Displaying advertisement 810 may be based on the location being inside the vehicle.

In some embodiments, advertisement 810 may be based on a current location of vehicle 100. For example, advertisement 810 may be based on stores within a specified distance of the current location of vehicle 810. The specified distance may be based on a distance traveled or by an amount of travel time. Advertisement 810 may also be based on a preference of person 120. For example, person 120 may select a preference to shop at dedicate pets' goods stores instead of warehouse stores. The preference of person 120 may be specified by the person, or may be based on historical behavior data. For example, person 120 may exclusively shop at a local pet store instead of a pet store chain. Advertisement 810 may include a promotion. The promotion may be specific to animal 110, person 120, vehicle 100, or some combination of the previous.

Figure 9:
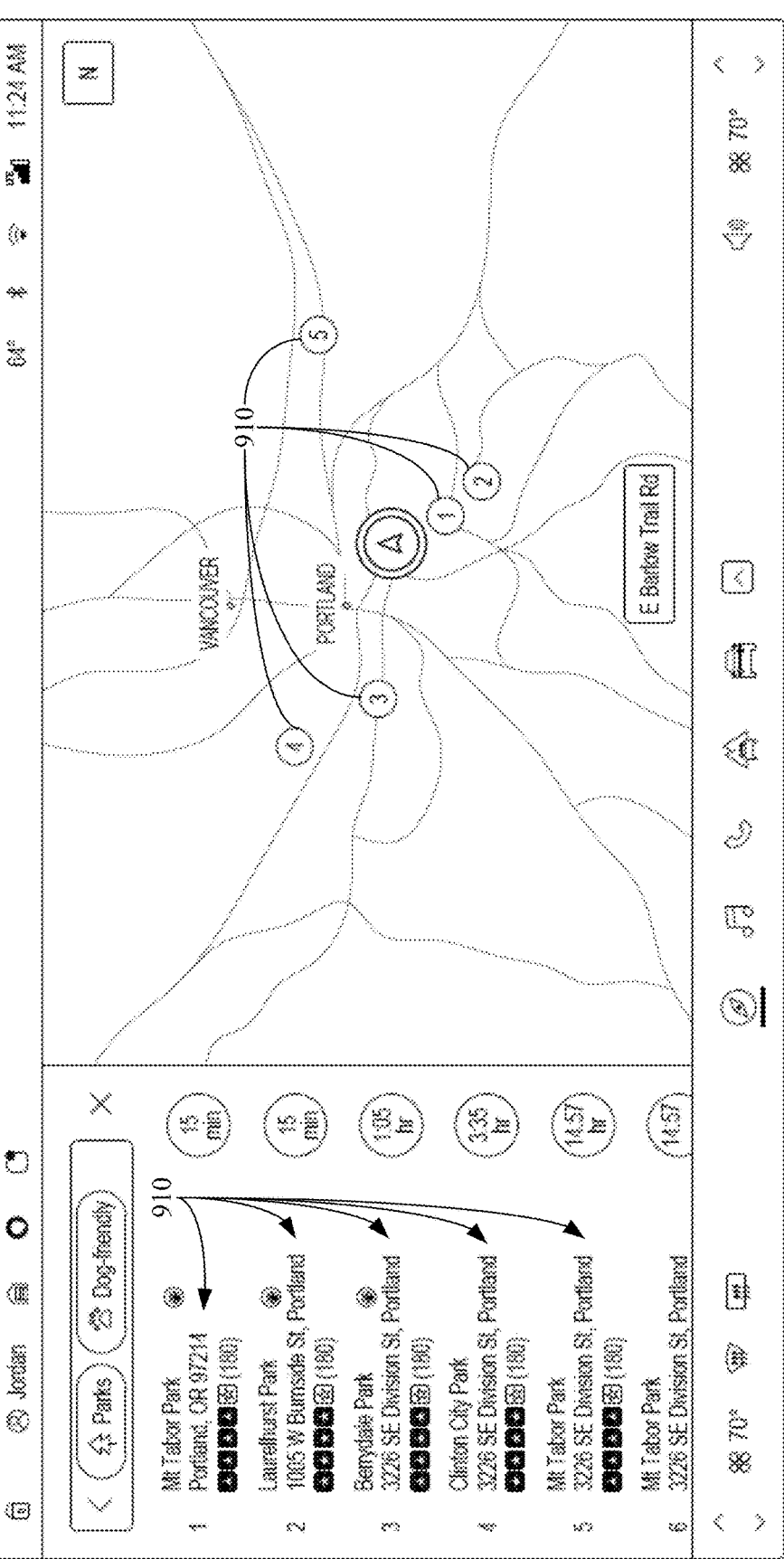
FIG. 9 illustrates an example of points-of-interest associated with an animal.

FIG. 9 illustrates an example points-of-interest user interface 900. In some embodiments, point-of-interest 910 associated with animal 110 may be displayed on a display associated with vehicle 100. Displaying point-of-interest 910 may be based on the information about animal 110 bearing the digital tag. Points-of-interest 910 may be filtered. The filters may include that the point-of-interest is a park or is dog-friendly. Points-of-interest 910 may be labeled as a park or as dog-friendly.

Figure 10:
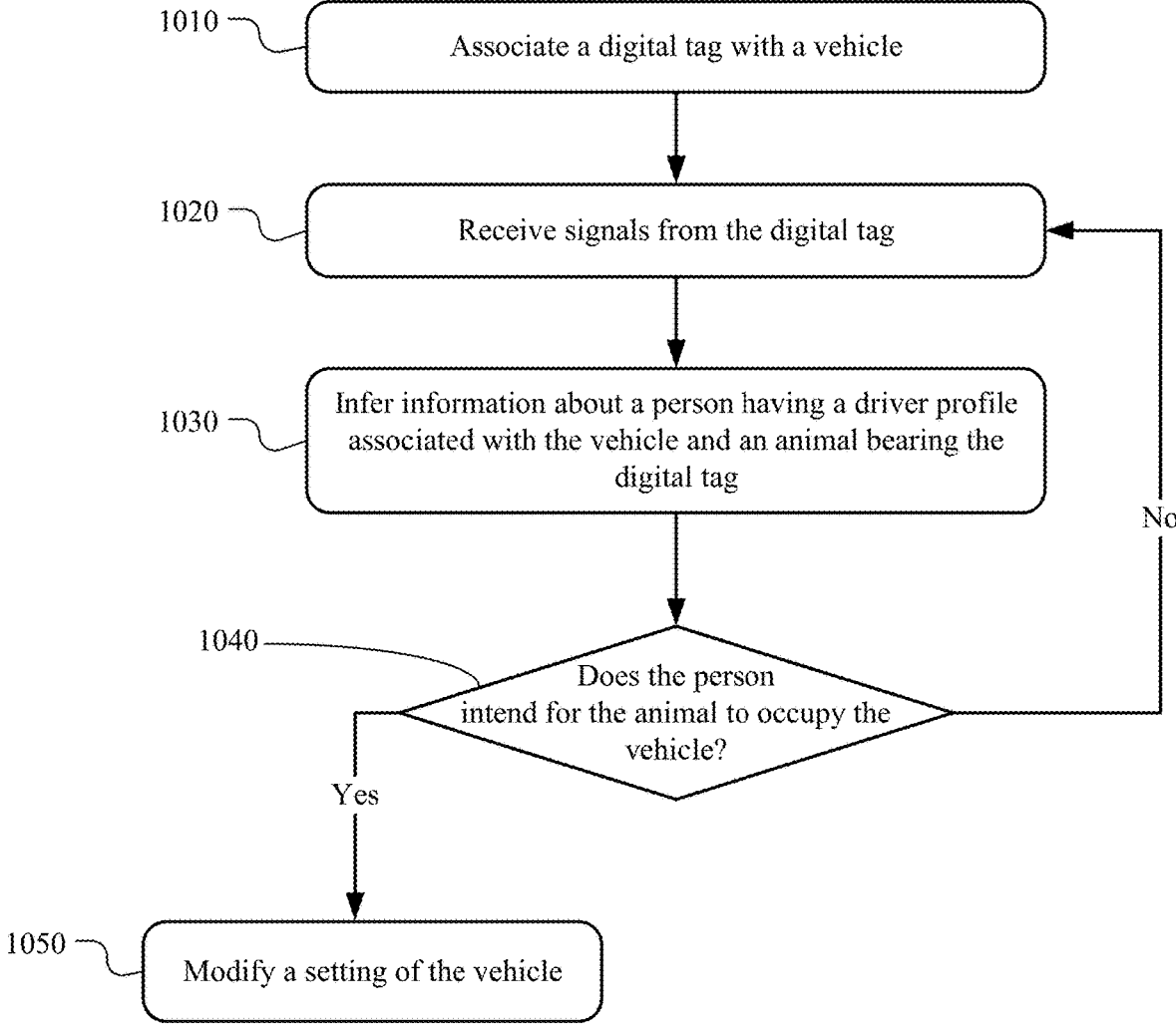
FIG. 10 is a flowchart illustrating steps of a method for configuring a vehicle.

FIG. 10 is a flowchart illustrating steps of a method 1000 for configuring a vehicle for accessibility. Method 1000 may begin at step 1010 with a control module of a vehicle associating a digital tag with a vehicle. Method 1000 may then continue at step 1020 with the control module of the vehicle receiving signals from the digital tag. Method 1000 may then continue at step 1030 with the control module of the vehicle inferring information about a person having a driver profile associated with the vehicle and an animal bearing the digital tag. At decision point 1040, the control module may determine whether the person intends for the animal to occupy the vehicle. If yes, method 1000 may then continue at step 1050 with modifying a setting of the vehicle. Otherwise, if no, then method 1000 may then return to step 1020 with the control module of the vehicle receiving signals from the digital tag.

Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for configuring a vehicle for accessibility including the particular steps of the method of FIG. 10, this disclosure contemplates any suitable method for configuring a vehicle for accessibility including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

Figure 11:
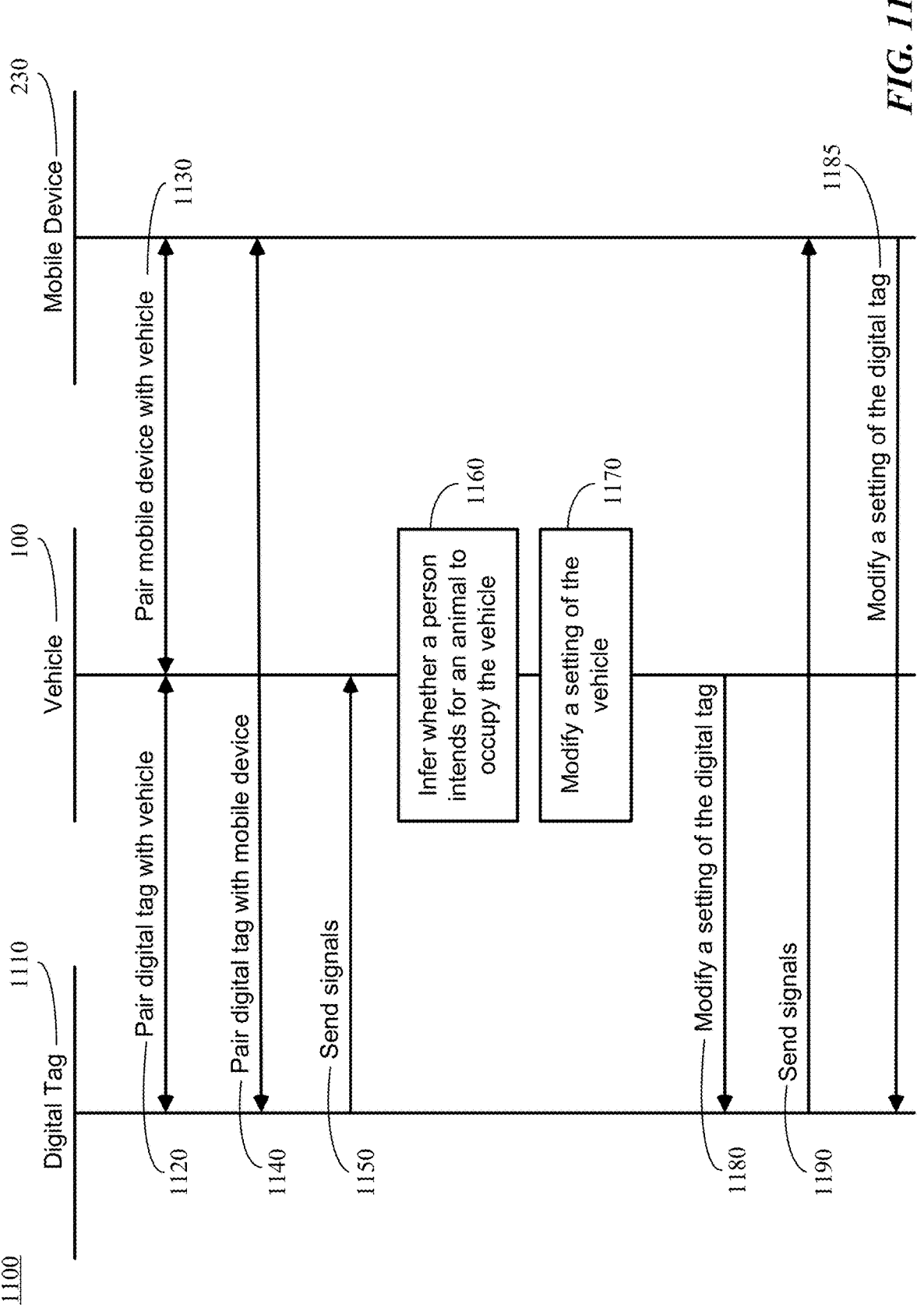
FIG. 11 is a diagram illustrating exchanges between a digital tag, a vehicle, and a mobile device.

FIG. 11 is diagram 1100 illustrating exchanges between digital tag 1110, vehicle 100, and mobile device 230. In some embodiments, digital tag 1110 and vehicle 100 may be paired 1120. Vehicle 100 and mobile device 230 may be paired 1130. Digital tag 1110 and mobile device 230 may be paired 1140. Digital tag 1110 may send signals 1150 to vehicle 100. The signals may include information such as position, velocity, or acceleration of digital tag 1110. The signals may also include information about animal 110 which bears digital tag 1110. The information may include a name (e.g., Buddy) of animal 110, a type (e.g., dog) of animal 110, or a breed (e.g., Golden Retriever) of animal 110. The information may also include people and locations associated with animal 110 (e.g., favorite dog park, groomer, or veterinarian). Based on the signals received from digital tag 1110, vehicle 100 may infer 1160 whether person 120 intends for animal 110 to occupy vehicle 100. Based on inferring 1160 from the information that person 120 intends for animal 110 to occupy vehicle 100, vehicle 100 may modify a setting 1170 of vehicle 100.

In some embodiments, vehicle 100 may infer 1160 whether person 120 intends for animal 110 to occupy vehicle 100 may be based on actions performed by person 120 or actions performed animal 110. The actions may include person 120 interacting with vehicle 100, animal 110 interacting with vehicle 100, or person 120 interacting with animal 110 in proximity to vehicle 100. For example, person 120 may arrive at vehicle 100 with animal 110. Then, person 120 may open a door of vehicle 100. Vehicle 100 may infer person 120 intends for animal 110 to occupy vehicle 100 based on the aforementioned actions. In another example, person 120 and animal 110 may be proximate to vehicle 100, and person 120 may be placing animal 110 into a kennel. Based on those actions, vehicle 100 may infer person 120 intends for animal 100 to occupy vehicle 100. Inferring 1160 may also be based on historical actions. For example, vehicle 100 may learn that every time person 120 arrives at vehicle 100 with animal 110 at a specified time (e.g. 8:00 am), person 120 intends for animal 110 to occupy vehicle 100. In this example, the inference may be made based on past occurrences where the animal did occupy the vehicle under those conditions. Vehicle 100 may also infer 1160 that person 120 intends for animal 110 to occupy vehicle 100 even when vehicle 100 does not detect person 120. In other words, vehicle 100 may infer 1160 based on animal 110's actions. For example, animal 110 may approach vehicle 100 and vehicle 100 may infer 1160 that the intent is for animal 110 to occupy the vehicle. In another example, the inference 1160 may be made when animal 110 approaches vehicle 100 and vehicle 100 is unlocked. For example, vehicle may infer 1160 that person 120 does not intend for animal 110 to occupy the vehicle when vehicle is locked.

In some embodiments, modifying the setting 1170 of vehicle 100 may include modifying a suspension setting, an assisted entry setting, a climate control setting, a safety setting, an occupancy alert setting, a collision warning setting, or a digital fence setting. Modifying the setting 1170, in some embodiments, may also include activating a Pet Mode.

In some embodiments, vehicle 100 may send instructions to digital tag 1110 to modify a setting 1180 of digital tag 1110. Mobile device 230 may also send instructions to digital tag 1110 to modify a setting 1185 of digital tag 1110. Modifying the setting of digital tag 1110 may include generating an output associated with digital tag 1110 or activating an extended tracking mode for digital tag 1110. The output associated with the digital tag may include an auditory output, a visual output, an electrical output, or a haptic output. In extended tracking mode, for some embodiments, digital tag 1110 may send signals 1190 to mobile device 230. The extended tracking mode for the digital tag may include allowing the transmitter or receiver of the digital tag to use more power. The extended tracking mode may also include activating a higher powered GPS module. Digital tag 1110 may also send signals 1190 to mobile device 230 when not in extended tracking mode (e.g., for the digital fence).

Figure 12:
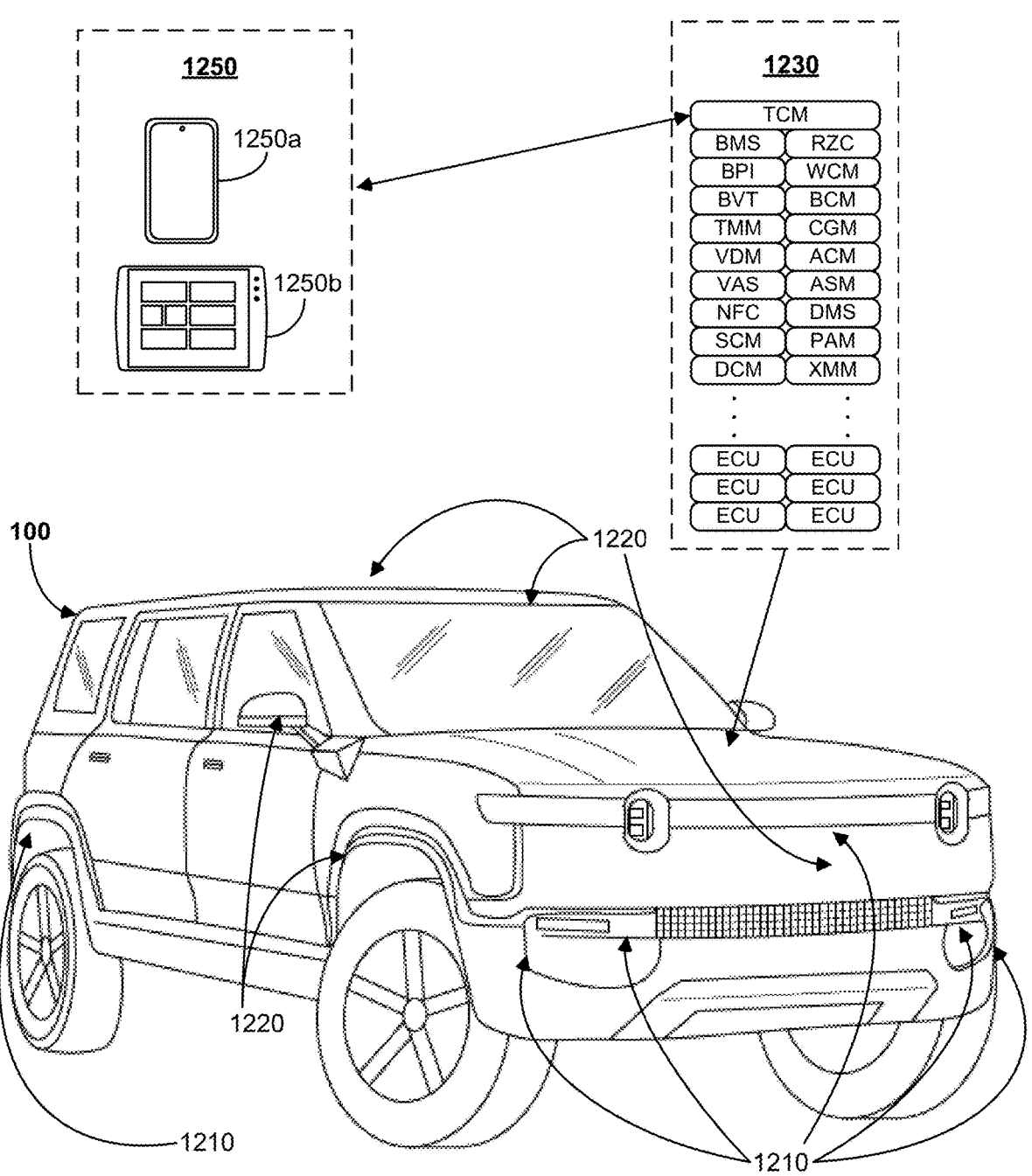
FIG. 12 illustrates an example vehicle.

FIG. 12 illustrates an example vehicle 100. Vehicle 100 may include multiple sensors 1210, multiple cameras 1220, and a control system 1230. In some embodiments, vehicle 100 may be able to pair with a computing device 1250 (e.g., smartphone 1250*a*, tablet computing device 1250*b*, or a smart vehicle accessory). As an example and not by way of limitation, a sensor 1210 may be an accelerometer, a gyroscope, a magnometer, a global positioning satellite (GPS) signal sensor, a vibration sensor (e.g., piezoelectric accelerometer), a light detection and ranging (LiDAR) sensor, a radio detection and ranging (RADAR) sensor, an ultrasonic sensor, a temperature sensor, a pressure sensor, a humidity sensor, a chemical sensor, an electromagnetic proximity sensor, an electric current sensor, another suitable sensor, or a combination thereof. As an example and not by way of limitation, a camera 1220 may be a still image camera, a video camera, a 3D scanning system (e.g., based on modulated light, laser triangulation, laser pulse, structured light, light detection and ranging (LiDAR)), an infrared camera, another suitable camera, or a combination thereof. Vehicle 100 may include various controllable components (e.g., doors, seats, windows, lights, HVAC, entertainment system, security system), instrument and information displays and/or interactive interfaces, functionality to pair a computing device 1250 with the vehicle (which may enable control of certain vehicle functions using the computing device 1250), and functionality to pair accessories with the vehicle, which may then be controllable through an interactive interface in the vehicle or through a paired computing device 1250.

Control system 1230 may enables control of various systems on-board the vehicle. As shown in FIG. 12, control system 1230 may comprise one or more electronic control units (ECUs), each of which are dedicated to a specific set of functions. Each ECU may be a computer system (as described further in FIG. 14), and each ECU may include functionality provide by one or more of the example ECUs described below.

Features of embodiments as described herein may be controlled by a Vehicle Dynamics Module (VDM) ECU. The VDM ECU may control a number of different functions related to aspects of the vehicle's drivetrain, regenerative braking, suspension, steering, traction control, distribution of mass, aerodynamics, and driving modes. In some embodiments, the VDM ECU may, by way of example and not limitation, control vehicle acceleration, control vehicle energy regeneration, calculate torque distribution, provide traction control, control drive modes, provide odometer functions, control driveline disconnects, adjust damping, adjust roll stiffness, adjust ride height, automatically level a vehicle when on a slope, and control the emergency parking brake driver.

Features of embodiments as described herein may be controlled by one or more ECUs that provide functionality to control access to the vehicle. A Vehicle Access System (VAS) ECU may provide passive/active wireless sensors (e.g., Bluetooth) authorizing accessing (i.e., locking or unlocking) the vehicle. A Near-Field Communication (NFC) ECU may support an NFC reader embedded in the vehicle (e.g., in the driver-side exterior door handle or in the armrest of the interior, driver-side door panel) for user authentication.

Features of embodiments as described herein may be controlled by a Telematics Control Module (TCM) ECU. The TCM ECU may provide a wireless vehicle communication gateway to support functionality such as, by way of example and not limitation, over-the-air (OTA) software updates, communication between the vehicle and the internet, communication between the vehicle and a computing device 1250, in-vehicle navigation, vehicle-to-vehicle communication, communication between the vehicle and landscape features (e.g., automated toll road sensors, automated toll gates, power dispensers at charging stations), or automated calling functionality.

Features of embodiments as described herein may be controlled by one or more ECUs that provide functionality to control interior cabin components of the vehicle. A Seat Control Module (SCM) ECU may provide functionality to control seat movement (e.g., slide, tilt, recline, height, lumbar support), steering column movement (e.g., reach, rake), seat heater(s), or seat ventilation. A Door Control Module (DCM) ECU may provide functionality to sense outside ambient temperature or to control one or more components of a door of the vehicle, such as, by way of example and not limitation: window glass (e.g., moving the glass up or down), door locks, door handles (e.g., automatically moving in or out to facilitate grasping the handle), lamp(s), side mirror(s) (e.g., up, down, in, out, fold, unfold), mirror heater(s), electro-chromatic mirror dimmers, turn signals, approach lighting, spotlight(s), blind spot monitor lamp(s), or window switch lamp(s). A Restraints Control Module (RCM) ECU may provide functionality to control components of a passive safety system of the vehicle (e.g., automatically tensioning seat belts, air bags, car seat or booster seat for a baby, child, or animal), such as, by way of example and not limitation, sensing a roll, pitch, or yaw movement of the vehicle or sensing whether components of the passive safety system are in use for one or more vehicle occupants.

Features of embodiments as described herein may be controlled by a Rear Zone Control (RZC) ECU. The RZC ECU may provide functionality to control different body components, such as, by way of example and not limitation, a license plate lamp, based on vehicle body type. For vehicles with a truck bed, the RZC ECU may provide functionality to control a tonneau cover, sidebin latch, tailgate latch, sidebin lights, or cargo lamps. For a sport utility-type vehicle with a rear door, the RZC ECU may provide functionality to control liftgate latches, a liftgate actuator, puddle lamps, or a rear wiper. For vehicles with a tow hitch, the RZC ECU may provide functionality to control trailer braking or a trailer brake stop light. For vehicles with a third row of seats, the RZC ECU may provide functionality to control movement of interior components to facilitate easy entry to the rear seats. For a delivery vehicle, the RZC ECU may provide functionality to control movement of a bulkhead door motor and latches, rollup door latches, various lamps, rear stop lights, and turn lights.

Features of embodiments as described herein may be controlled by a Body Control Module (BCM) ECU. The BCM ECU may provide electronic controls for various components of the body of the vehicle, such as, by way of example and not limitation: interior lighting (e.g., cabin lights, seatbelt lights), exterior lighting (e.g., headlamps, side lights, rear lights, camp lights), power outlets, frunk switch, window wiper movement and washer fluid deployment, the overhead center console, horn, power ports, and wireless accessory charging and docking.

Features of embodiments as described herein may be controlled by a Central Gateway Module (CGM) ECU. The CGM ECU may serve as the vehicle's communications hub that connects and transfer data to and from the various ECUs, sensors, cameras, motors, and other vehicle components. The CGM ECU may include a network switch that provides connectivity through Controller Area Network (CAN) ports, Local Interconnect Network (LIN) ports, and Ethernet ports. The CGM ECU may also serve as the master control over the different vehicle modes (e.g., road driving mode, parked mode, off-roading mode, tow mode, camping mode), and thereby control certain vehicle components related to placing the vehicle in one of the vehicle modes. In some embodiments, for electric vehicles, the CGM ECU may also control the vehicle charge port door and related light(s) and sensor(s).

Features of embodiments as described herein may be controlled by an Experience Management Module (XMM) ECU may generate a user interface displayed on a dashboard of the vehicle. The user interface may display information and provide audio output for an infotainment system, including various views around and inside the vehicle. XMM may provide interactive controls for a number of different vehicle functions that may be controlled in conjunction with enabling the designated mode, such as, by way of example and not limitation: controlling interior and exterior lighting, vehicle displays (e.g., instrument cluster, center information display, and rear console display), audio output (e.g., audio processing, echo cancellation, beam focusing), music playback, heating, ventilation, and air conditioning (HVAC) controls, power settings, Wi-Fi connectivity, Bluetooth device connectivity, and vehicle leveling, as well as displaying information in the user interface (e.g., surround view camera feed, distance to nearest charger, and minimum range). In some embodiments, interactive controls provided by XMM may enable interaction with other modules of control system 1230.

Vehicle 100 may include one or more additional ECUs, such as, by way of example and not limitation: an Autonomy Control Module (ACM) ECU, an Autonomous Safety Module (ASM) ECU, a Driver Monitoring System (DMS) ECU, and/or a Winch Control Module (WCM) ECU. If vehicle 100 is an electric vehicle, one or more ECUs may provide functionality related to the battery pack of the vehicle, such as a Battery Management System (BMS) ECU, a Battery Power Isolation (BPI) ECU, a Balancing Voltage Temperature (BVT) ECU, and/or a Thermal Management Module (TMM) ECU.

Figure 13:
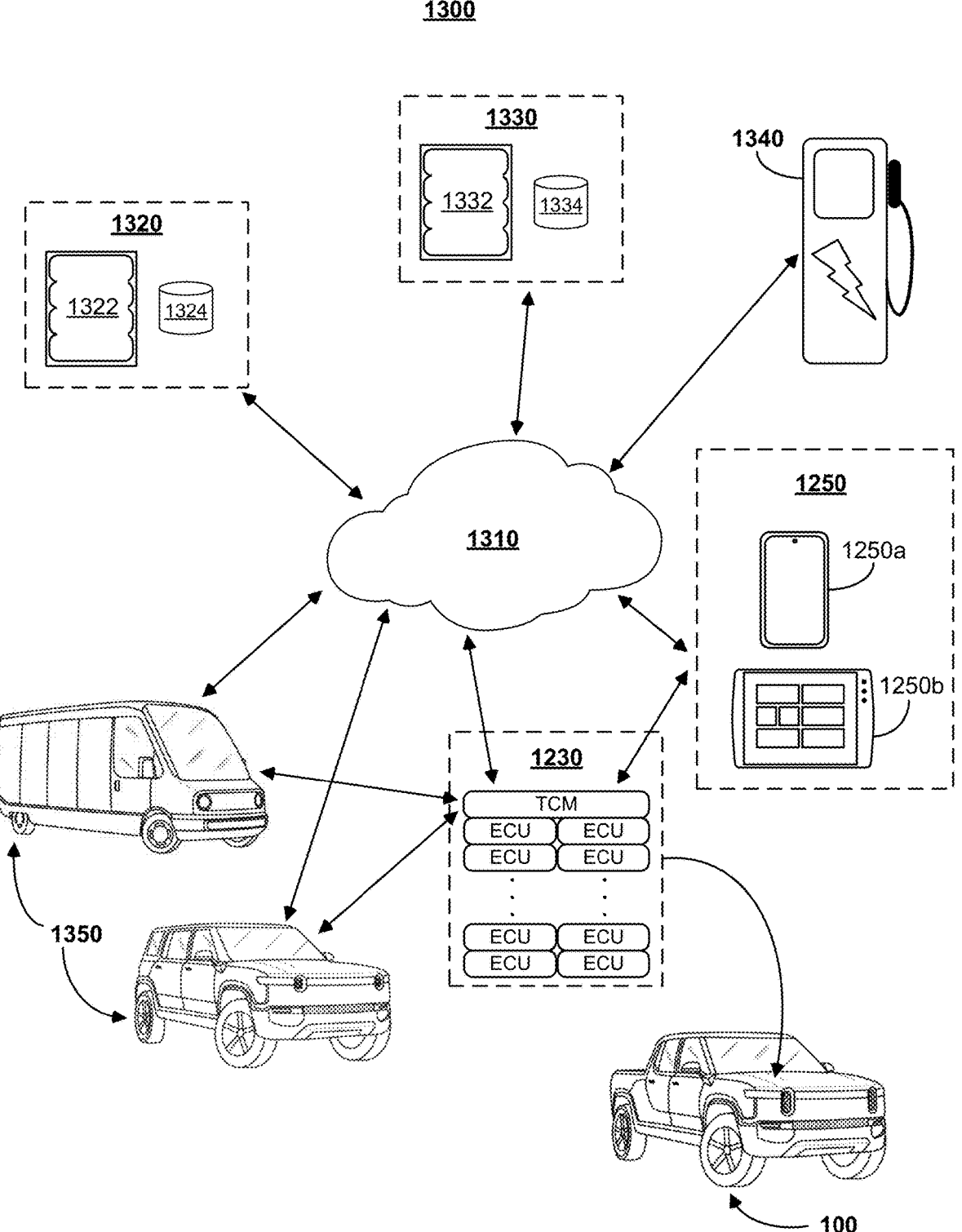
FIG. 13 illustrates an example network system including a connected vehicle.

FIG. 13 illustrates an example networked environment 1300. Computer system 1300 may include a connected vehicle 100 with a control system 1230 that is capable of transmitting data to/from a network 1310. Network 1310 may also be connected to one or more computing servers 1320 (e.g., including compute units 1322 and storage units 1324) associated with a vehicle manufacturer, a vehicle service provider, a vehicle fleet operator, or a vehicle-charging facility provider. Network 1310 may also be connected to one or more third-party computing servers 1330 TC (e.g., including compute units 1332 and storage units 1334) associated with, for example, a smart accessory manufacturer, a group event organizer, service provider, or a governmental organization. Networked environment 1300 may include one or more landscape features 1340 (e.g., automated toll road sensors, smart road signs or road markers, automated toll gates, power dispensers at charging stations). Networked environment 1300 may also include other connected vehicles 1350 that may be capable of communicating with vehicle 100 through network 1310 and/or directly with vehicle 100 (e.g., by communicating with a TCM ECU of a control system 1230 of vehicle 100 when connected vehicle 1350 is within range of a short-range communications network, such as Bluetooth). Networked environment 1300 may also include one or more computing devices 1250 (e.g., smartphone 1250a, a tablet computing device 1250b, or a smart vehicle accessory) capable of communicating with network 1310 and/or directly with vehicle 100.

Networked environment 1300 may enable transmission of data and communications between any of the depicted elements. In some embodiments, such information may be communicated in only one direction (e.g., a smart road sign broadcasting information related to traffic control or delays due to construction); in other embodiments, information may include two-way communications (e.g., an automated toll gate that processes a request received from vehicle 100 to deduct a toll from a specified account and provides confirmation of the transaction). In particular embodiments, one or more elements of networked environment 1300 may include one or more computer systems, as described in further detail with respect to FIG. 14A. In particular embodiments, one or more elements of networked environment 1300 perform one or more steps of one or more methods described or illustrated herein. In particular embodiments, software running on one or more elements of networked environment 1300 may be controlled by a single entity to perform one or more steps of one or more methods described or illustrated herein or provide functionality described or illustrated herein.

Figures 14A, 14B:
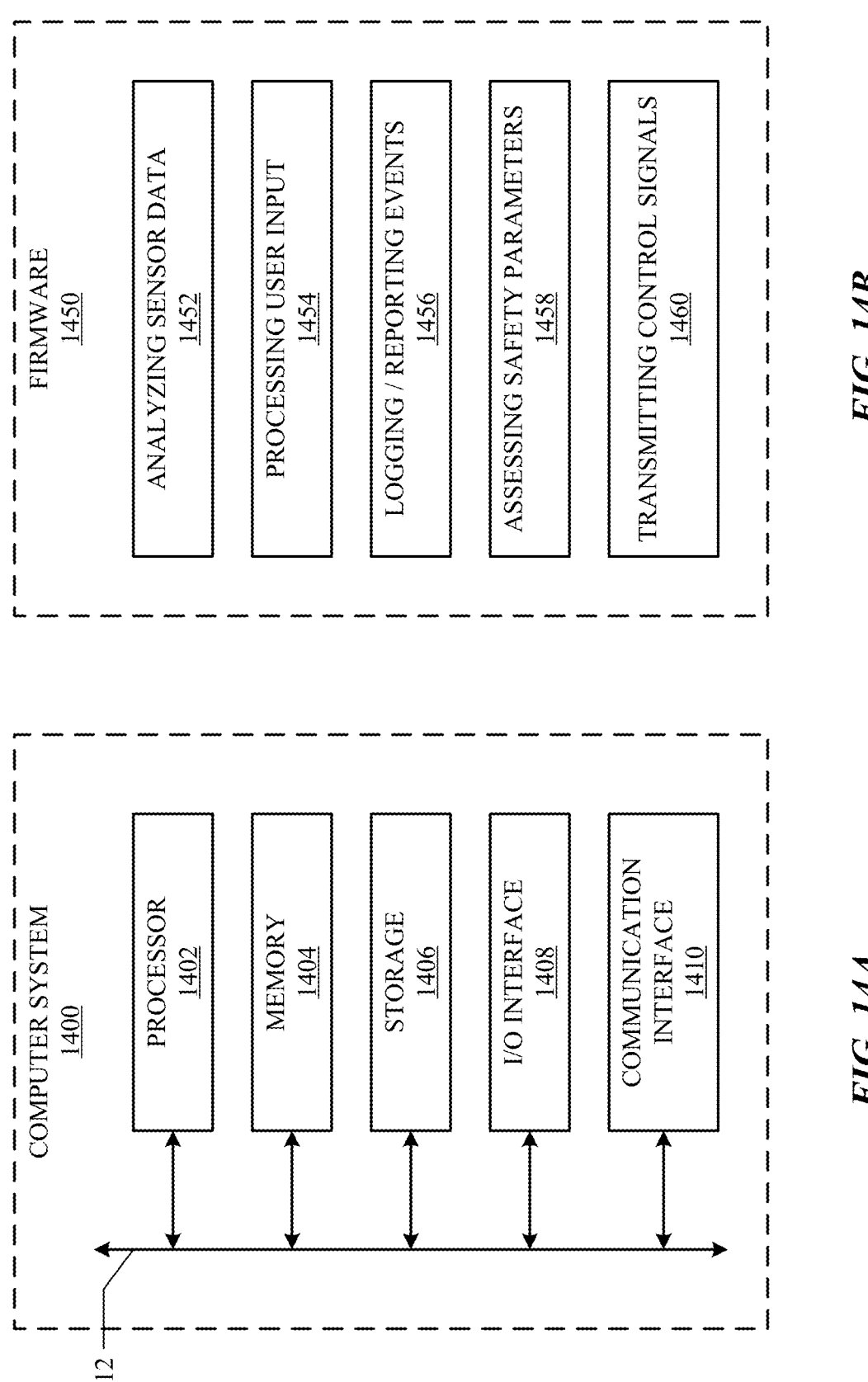
FIG. 14A is a schematic of an example computer system.
FIG. 14B illustrates example firmware for a vehicle ECU.

FIG. 14A illustrates an example computer system 1400. Computer system 1400 may include a processor 1402, memory 1404, storage 1406, an input/output (I/O) interface 1408, a communication interface 1410, and a bus 1412. Although this disclosure describes one example computer system including specified components in a particular arrangement, this disclosure contemplates any suitable computer system with any suitable number of any suitable components in any suitable arrangement. As an example and not by way of limitation, computer system 1400 may be an electronic control unit (ECU), an embedded computer system, a system-on-chip, a single-board computer system, a desktop computer system, a laptop or notebook computer system, a mainframe, a mesh of computer systems, a mobile telephone, a personal digital assistant, a server computing system, a tablet computer system, or a combination of two or more of these. Where appropriate, computer system 1400 may include one or more computer systems 1400; be unitary or distributed, span multiple locations, machines, or data centers; or reside in a cloud, which may include one or more cloud components in one or more networks. Where appropriate, computer system(s) 1400 may perform, at different times or at different locations, in real time or in batch mode, one or more steps of one or more methods described or illustrated herein.

Processor 1402 (e.g., compute units 1322 and 1332) may include hardware for executing instructions, such as those making up a computer program. As an example and not by way of limitation, to execute instructions, processor 1402 may retrieve (or fetch) the instructions from an internal register, an internal cache, memory 1404, or storage 1406; decode and execute them; and then write one or more results to an internal register, an internal cache, memory 1404, or storage 1406 (e.g., storage units 1324 and 1334). Processor 1402 may include one or more internal caches for data, instructions, or addresses.

In particular embodiments, memory 1404 includes main memory for storing instructions for processor 1402 to execute or data for processor 1402 to operate on. In particular embodiments, one or more memory management units (MMUs) reside between processor 1402 and memory 1404 and facilitate accesses to memory 1404 requested by processor 1402. In particular embodiments, memory 1404 includes random access memory (RAM). This disclosure contemplates any suitable RAM.

In particular embodiments, storage 1406 includes mass storage for data or instructions. As an example and not by way of limitation, storage 1406 may include a removable disk drive, flash memory, an optical disc, a magneto-optical disc, magnetic tape, or a Universal Serial Bus (USB) drive or two or more of these. Storage 1406 may include removable or fixed media and may be internal or external to computer system 1400. Storage 1406 may include any suitable form of non-volatile, solid-state memory or read-only memory (ROM).

In particular embodiments, I/O interface 1408 includes hardware, software, or both, providing one or more interfaces for communication between computer system 1400 and one or more input and/or output (I/O) devices. Computer system 1400 may be communicably connected to one or more of these I/O devices, which may be incorporated into, plugged into, paired with, or otherwise communicably connected to vehicle 100 (e.g., through the TCM ECU). An input device may include any suitable device for converting volitional user input into digital signals that can be processed by computer system 1400, such as, by way of example and not limitation, a steering wheel, a touch screen, a microphone, a joystick, a scroll wheel, a button, a toggle, a switch, a dial, or a pedal. An input device may include one or more sensors for capturing different types of information, such as, by way of example and not limitation, sensors 1210 described above. An output device may include devices designed to receive digital signals from computer system 1400 and convert them to an output format, such as, by way of example and not limitation, speakers, headphones, a display screen, a heads-up display, a lamp, a smart vehicle accessory, another suitable output device, or a combination thereof. This disclosure contemplates any suitable I/O devices and any suitable I/O interfaces 1408 for them. I/O interface 1408 may include one or more I/O interfaces 1408, where appropriate.

In particular embodiments, communication interface 1410 includes hardware, software, or both providing one or more interfaces for data communication between computer system 1400 and one or more other computer systems 1400 or one or more networks. Communication interface 1410 may include one or more interfaces to a controller area network (CAN) or to a local interconnect network (LIN). Communication interface 1410 may include one or more of a serial peripheral interface (SPI) or an isolated serial peripheral interface (isoSPI). In some embodiments, communication interface 1410 may include a network interface controller (NIC) or network adapter for communicating with an Ethernet or other wire-based network or a wireless NIC (WNIC) or wireless adapter for communicating with a wireless network, such as a WI-FI network or a cellular network.

In particular embodiments, bus 1412 includes hardware, software, or both coupling components of computer system 1400 to each other. Bus 1412 may include any suitable bus, as well as one or more buses 1412, where appropriate. Although this disclosure describes a particular bus, any suitable bus or interconnect is contemplated.

Herein, a computer-readable non-transitory storage medium or media may include one or more semiconductor-based or other integrated circuits (ICs) (such, as for example, field-programmable gate arrays or application-specific ICs), hard disk drives, hybrid hard drives, optical discs, optical disc drives, magneto-optical discs, magneto-optical drives, solid-state drives, RAM drives, any other suitable computer-readable non-transitory storage media, or any suitable combination. A computer-readable non-transitory storage medium may be volatile, non-volatile, or a combination of volatile and non-volatile, where appropriate.

FIG. 14B illustrates example firmware 1450 for a vehicle ECU 1400 as described with respect to control system 1230. Firmware 1450 may include functions 1452 for analyzing sensor data based on signals received from sensors 1210 or cameras 1220 received through communication interface 1410. Firmware 1450 may include functions 1454 for processing user input (e.g., directly provided by a driver of or passenger in vehicle 100, or provided through a computing device 1250) received through I/O interface 1408. Firmware 1450 may include functions 1456 for logging detected events (which may be stored in storage 1406 or uploaded to the cloud), as well as functions for reporting detected events (e.g., to a driver or passenger of the vehicle through an instrument display or interactive interface of the vehicle, or to a vehicle manufacturer, service provider, or third party through communication interface 1410). Firmware 1450 may include functions 1458 for assessing safety parameters (e.g., monitoring the temperature of a vehicle battery or the distance between vehicle 100 and nearby vehicles). Firmware 1450 may include functions 1460 for transmitting control signals to components of vehicle 100, including other vehicle ECUs 1400.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method for operating a digital tag comprising:
   associating, by a control module of a vehicle, the digital tag with the vehicle;
   receiving, by the control module, signals from the digital tag;
   inferring, by the control module and based on the signals, information about a person having a driver profile associated with the vehicle and an animal bearing the digital tag;
   determining, via one or more sensors of the vehicle, a velocity or an acceleration of the digital tag; and
   modifying a setting associated with the digital tag based on the velocity or the acceleration of the digital tag.

2. The method of claim 1, wherein the setting comprises a digital fence setting.

3. The method of claim 2, wherein modifying the digital fence setting comprises:
   determining a distance from the vehicle or a mobile device associated with the vehicle to a location of the animal; and
   generating, based on the distance being greater than a threshold distance, a notification to the person.

4. The method of claim 1, wherein modifying the setting associated with the digital tag is further based on a distance from the vehicle or a mobile device associated with the vehicle to a location of the animal being greater than a threshold distance.

5. The method of claim 4, wherein modifying the setting associated with the digital tag comprises activating an extended tracking mode for the digital tag.

6. The method of claim 5, wherein activating the extended tracking mode comprises activating a higher-powered locating system, and wherein the higher-powered locating system comprises a global-positioning system.

7. The method of claim 1, wherein the digital tag is incorporated in a wearable device or an article of clothing, and wherein the wearable device comprises a collar, a harness, or a head halter.

8. The method of claim 1, further comprising:
   displaying, by the control module and based on the information about the animal bearing the digital tag, a point-of-interest associated with the animal on a display associated with the vehicle.

9. The method of claim 1, further comprising:
   capturing, by the control module and a sensor, auditory information associated with the animal; and
   modifying, based on the auditory information, a setting associated with a security system associated with the vehicle.

10. A system including one or more computing devices, comprising:
   one or more non-transitory computer-readable storage media including instructions; and
   one or more processors coupled to the one or more non-transitory computer-readable storage media, the one or more processors configured to execute the instructions to:
      associate, by a control module, a digital tag with a vehicle;
      receive, by the control module, signals from the digital tag;
      infer, by the control module and based on the signals, information about a person having a driver profile associated with the vehicle and an animal bearing the digital tag;
      determine, via one or more sensors of the vehicle, a velocity or an acceleration of the digital tag; and
      modify a setting associated with the digital tag based on the determined velocity or the determined acceleration of the digital tag.

11. A non-transitory computer-readable medium comprising instructions that, when executed by one or more processors of one or more computing devices, cause the one or more processors to:
   associate, by a control module, a digital tag with a vehicle;
   receive, by the control module, signals from the digital tag;
   infer, by the control module and based on the signals, information about a person having a driver profile associated with the vehicle and an animal bearing the digital tag;
   determine, via one or more sensors of the vehicle, a velocity or an acceleration of the digital tag; and
   modify a setting associated with the digital tag based on the determined velocity or the determined acceleration of the digital tag.

12. The method of claim 4, wherein the modifying the setting associated with the digital tag comprises generating an auditory output, a visual output, an electrical output, or a haptic output.

13. The method of claim 12, wherein the auditory output comprises a set of frequencies that are within an animal hearing range and outside of a human hearing range.

14. The method of claim 12, wherein the electrical output comprises an electrical shock.

15. The method of claim 12, wherein the auditory output, the visual output, the electrical output, or the haptic output varies based on the velocity, the acceleration, or an amount of the distance above the threshold distance.

16. The method of claim 1, wherein the one or more sensors of the vehicle acquire range information between the vehicle and the digital tag based on one or more signal received from the digital tag.

17. The method of claim 1, wherein the one or more sensors of the vehicle acquire images of the animal bearing the digital tag, and the velocity or the acceleration of the digital tag is determined based on the images.

18. The method of claim 1, wherein the modifying the setting associated with the digital tag comprises generating an auditory output, a visual output, an electrical output, or a haptic output, and the auditory output, the visual output, the electrical output, or the haptic output varies based on the velocity or the acceleration.

* * * * *